(12) United States Patent
Uchikado et al.

(10) Patent No.: US 8,266,400 B2
(45) Date of Patent: Sep. 11, 2012

(54) COMPUTER SYSTEM REMOTE COPYING SYSTEM AND COMPUTER SYSTEM

(75) Inventors: Makoto Uchikado, Yokohama (JP); Taiki Miyaji, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 531 days.

(21) Appl. No.: 12/540,792

(22) Filed: Aug. 13, 2009

(65) Prior Publication Data
US 2010/0332776 A1  Dec. 30, 2010

(30) Foreign Application Priority Data
Jun. 24, 2009  (JP) ................. 2009-149654

(51) Int. Cl.
G06F 12/16    (2006.01)
G06F 15/167   (2006.01)

(52) U.S. Cl. .......... 711/162; 709/213; 710/39; 710/112; 711/111; 711/154; 711/E12.001; 711/E12.103; 714/E11.118; 718/100

(58) Field of Classification Search .................. None
See application file for complete search history.

(56) References Cited

U.S. PATENT DOCUMENTS

| | | | |
|---|---|---|---|
| 5,745,781 A * | 4/1998 | Ekanadham et al. | 712/29 |
| 7,152,079 B2 | 12/2006 | Hirakawa et al. | |
| 2003/0126387 A1 * | 7/2003 | Watanabe | 711/161 |
| 2005/0198327 A1 | 9/2005 | Iwamura et al. | |
| 2005/0198452 A1 * | 9/2005 | Watanabe | 711/162 |
| 2006/0236050 A1 * | 10/2006 | Sugimoto et al. | 711/162 |
| 2007/0022121 A1 * | 1/2007 | Bahar et al. | 707/10 |
| 2007/0168362 A1 | 7/2007 | Hirakawa et al. | |
| 2007/0271430 A1 * | 11/2007 | Maki et al. | 711/162 |

FOREIGN PATENT DOCUMENTS

| | | |
|---|---|---|
| JP | 2005-250626 A | 9/2005 |
| JP | 2007-128414 | 5/2007 |
| JP | 2008-040762 | 2/2008 |
| JP | 4124348 B2 | 5/2008 |
| JP | 2008-146376 | 6/2008 |
| JP | 2009-123055 | 6/2009 |

* cited by examiner

Primary Examiner — Jasmine Song
Assistant Examiner — Daniel Bernard
(74) Attorney, Agent, or Firm — Foley & Lardner LLP

(57) ABSTRACT

When a virtual tape of the main storage system is updated, journal data is created. The journal data is transmitted to the disaster recovery storage system asynchronously with the timing at which the write data is received. The journal data includes a marker to notify of the start of updating and a marker to notify of the completion of updating. The disaster recovery storage system prohibits the use of the copy destination data during the period from start of updating until completion of updating, and permits referencing the copy destination data during other periods.

20 Claims, 30 Drawing Sheets

FIG.6

VTLS TABLE T10

| C10 | C11 | C12 STORAGE LOCATION | | | | C13 WRITE MARKER WRITE DESTINATION | | |
|---|---|---|---|---|---|---|---|---|
| | | C120 | C121 | C122 | | C130 | C131 | C132 |
| VT# | VT NAME | VOL-ID | START ADDRESS | END ADDRESS | | VOL-ID | START ADDRESS | END ADDRESS |
| 1 | VT-ABC01 | VOL1 | 0000 | 001F | | VOL1 | 0000 | 0003 |
| | | VOL1 | 00030 | 003F | | VOL1 | 0020 | 0023 |
| 2 | VT-DEF02 | VOL1 | 0020 | 002F | | | | |
| | | VOL2 | 00000 | 004F | | | | |
| ⋮ | ⋮ | ⋮ | ⋮ | ⋮ | | ⋮ | ⋮ | ⋮ |

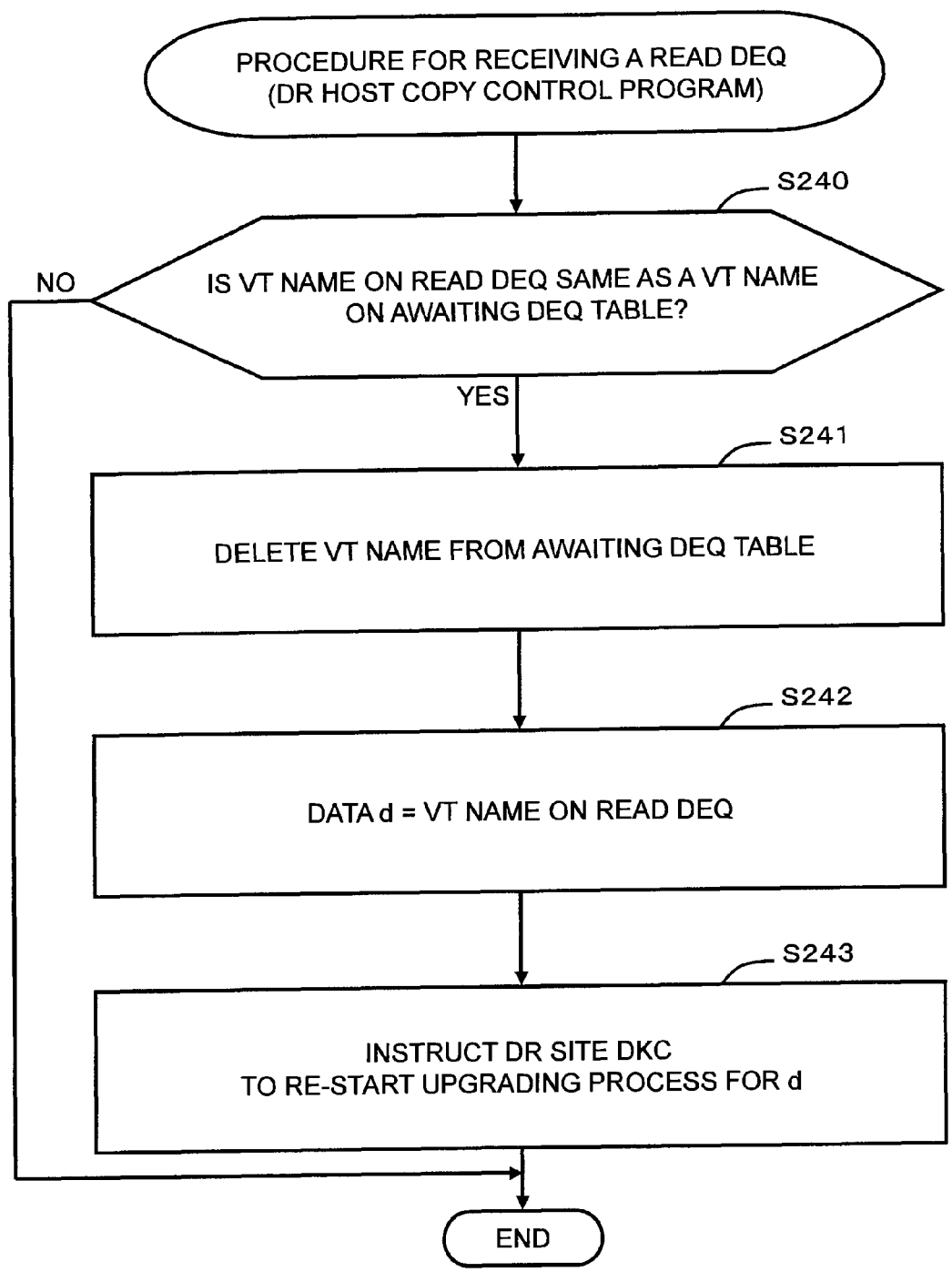

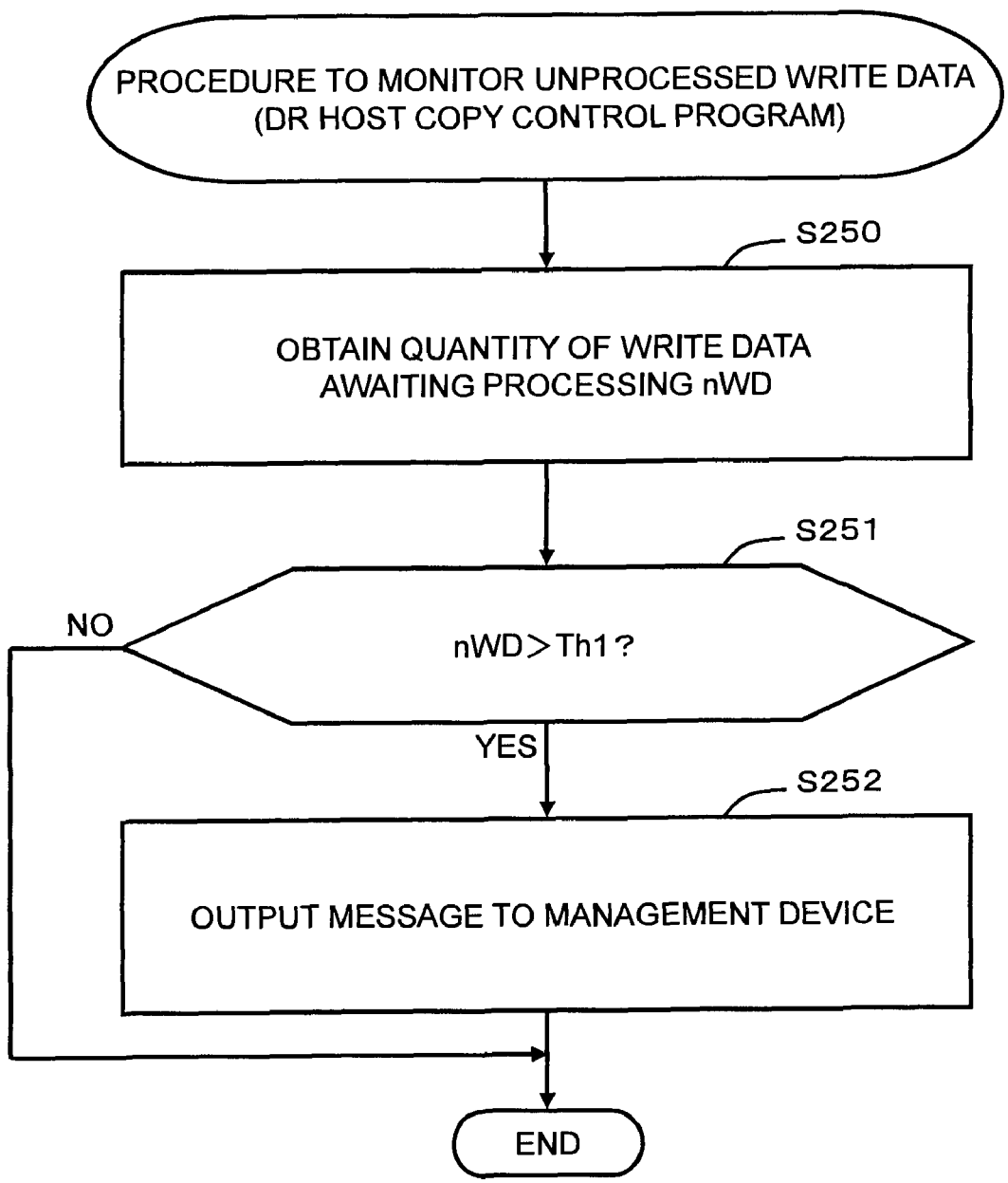

COMPUTER SYSTEM REMOTE COPYING SYSTEM AND COMPUTER SYSTEM

CROSS-REFERENCE TO RELATED APPLICATIONS

This application relates to and claims priority from Japanese Patent Application No. 2009-149654 filed on Jun. 24, 2009, the entire disclosure of which is incorporated herein by reference.

BACKGROUND OF THE INVENTION

1. Field of the Invention

The present invention relates to a computer system remote copying method and a computer system.

2. Description of the Related Art

To manage the large volume of data that grows day by day, computer systems used by corporations and the like include storage systems capable of storing large quantities of data. Storage systems for example create redundant storage areas based on a redundant array of independent disks (RAID) using hard disk drives or the like. These redundant logical storage areas are referred to as logical volumes, and provided to the host computers within the computer system.

In recent years computer systems have been constructed that have been strengthened against disasters such as earthquakes, fire, and the like. Computer systems with improved readiness against disasters have a main site and a back up site in a location separated from the main site. A host computer and a storage system are provided at both the main site and the back up site. The data that is managed at the main site is transmitted to the back up site as appropriate, and is also stored at the back up site.

The configuration in which a host computer and a storage system are each provided at a plurality of sites, and the data stored at each site is the same, as described above, is known as a disaster recovery configuration (Japanese Patent Application Laid-open No. 2005-250626, Japanese Patent No. 4124348). In a computer system having a disaster recovery configuration, it is possible to shorten the stoppage time of mission critical work when a disaster occurs at the main site which is normally used, by immediately switching to the back up site.

Methods for managing the duplication of data at the main site and at the back up site include synchronous remote copying and asynchronous remote copying, as disclosed in the above patent documents. In synchronous remote copying, when the host computer of the main site writes data to the storage system, the written data is sent to the storage system of the back up site. After the storage system of the main site has confirmed that the written data has been stored in the storage system of the back up site, it sends the host computer of the main site notification that processing the write command has been completed.

In contrast, in asynchronous remote copying, when the storage system at the main site has stored the write data from the host computer of the main site, it notifies the host computer that processing of the write command has been completed. Then, at appropriate timing, the write data is sent from the storage system of the main site to the storage system of the back up site. The storage system of the back up site stores the write data at a different timing than the timing at which the storage system of the main site received and stored the write data.

Synchronous remote copying and asynchronous remote copying differ as described above. Asynchronous remote copying is adopted when the communication distance between the main site and the back up site is long, or when a high response performance is required. In asynchronous remote copying, the host computer is notified of completion of processing without waiting for completion of storage of the write data at the back up site, so the write response time can be shortened.

Further, by carrying out remote copying between the storage system of the main site and the storage system of the back up site, the load on the host computer of the main site and the host computer of the back up site can be reduced.

In the case of a disaster recovery configuration using asynchronous remote copying, the host computer of the back up site cannot use the data (copy destination data) stored in the storage system of the back up site.

This is because asynchronous remote copying is carried out between storage systems without the intervention of the host computer, so the host computer of the back up site cannot confirm whether the current copy destination data is the latest data or not. Therefore, in the conventional art, the data stored in the storage system of the back up site cannot be used except for disaster recovery, so its availability is low.

SUMMARY OF THE INVENTION

Therefore, it is an object of the present invention to provide a computer system remote copying method and computer system in which asynchronous remote copying is carried out, and the copy destination data can be directly used. Further objects of the present invention will become clear from the explanation of the embodiments which are described later.

In order to solve the above task, the remote copying method according to a first aspect of the present invention is a remote copying method executed by a computer system that includes a first computer; a first storage system coupled to the first computer; a second storage system coupled to the first storage system; and a second computer coupled to the second storage system, the remote copying method comprising the steps of: the first storage system creating a first logical volume that is accessed by the first computer; the second storage system creating a second logical volume in which a copy of the data stored in the first logical volume is stored; the first computer executing a first operating system and a first program, and transmitting a plurality of write data generated by the first program to the first storage system; the second computer executing a second operating system and a second program; the first operating system receiving an enqueue request which is issued by the first program, specifies a first data object, and indicates the start of updating to ensure consistency of the first data object with the first program, and transmitting a start marker request that includes information on the first data object to the first storage system; the first operating system receiving a dequeue request which is issued by the first program, specifies the first data object, and indicates completion of updating relating to the first data object, and transmitting an end marker request that includes information on the first data object to the first storage system; the first storage system receiving the plurality of write data, the start marker request and the end marker request, and updating the data stored in the first logical volume using the plurality of write data; the first storage system generating a plurality of transmission data including the plurality of write data, start marker information corresponding to the start marker request, end marker information corresponding to the end marker request, and a plurality of sequence information on the timing of receipt of the plurality of write data, the start marker information and the end marker information; the first storage system transmitting the plurality of transmission data to the second storage system asynchronously with the reception of the plurality of write data; the second storage system receiving the plurality of transmission data; the second storage system identifying, based on the sequence information, a series of write data included in the plurality of transmission data, relating to a second data object that is a copy of the first data object, and including the plurality of write data received by the first storage system after receipt of the start marker request and before receipt of the end marker request; the second storage system transmitting an update start notification that includes information on the second data object to the second computer, in accordance with a judgment that the data stored in the second logical volume is to be updated using a part or all of the series of write data; the second program issuing an enqueue request that specifies the second data object to the second operating system, and if the enqueue request is successful, transmitting a response to the update start notification to the second storage system via the second operating system; the second storage system starting to update the data stored in the second logical volume using the series of write data, and, when updating of the data stored in the second logical volume is completed, transmitting an update completion notification to the second computer; and the second program issuing a dequeue request specifying the second data object to the second operating system when the update completion notification is received.

In a second aspect, in the first aspect the second computer executes a third program, and the second operating system manages the second data object so that reading or writing the data of the second data object by the third program is prevented from receipt of the enqueue request specifying the second data object until receipt of the dequeue request specifying the second data object.

In a third aspect, in the second aspect the first computer executes a fourth program, and the first operating system manages the first data object so that reading or writing the data of the first data object by the fourth program is prevented from receipt of the enqueue request specifying the first data object until receipt of the dequeue request specifying the first data object.

In a fourth aspect, in the second aspect the third program issues the enqueue request specifying the second data object to the second operating system, and if the enqueue request is successful, reads data on the second data object, then issues the dequeue request specifying the second data object to the second operating system.

In a fifth aspect, in the fourth aspect the computer system includes a back up storage system, and the third program transmits the data on the second data object to the back up storage system as data in a state that is consistent with the first program.

In a sixth aspect, in the fifth aspect the first data object is a data unit that can be recognized by the first storage system.

In a seventh aspect, in the sixth aspect the first data object is data that cannot be recognized by the first storage system, but can be recognized by the first program.

In an eighth aspect, in the first aspect the second program obtains unused data quantity information on the quantity of write data that has not been used for updating the data stored in the second logical volume, from among the plurality of write data stored in the second storage system, and the second program displays, based on the unused data quantity information, information indicating that the quantity of write data stored in the second storage system exceeds a predetermined threshold for the purpose of waiting for the enqueue request to succeed.

A computer system according to a ninth aspect comprises a first computer; a first storage system coupled to the first computer; a second storage system coupled to the first storage system; and a second computer coupled to the second storage system, the computer system performing remote copying from the first storage system to the second storage system, wherein the first storage system creates a first logical volume that is accessed by the first computer; the second storage system creates a second logical volume in which a copy of the data stored in the first logical volume is stored; the first computer executes a first operating system and a first program, and transmits a plurality of write data generated by the first program to the first storage system; the second computer executes a second operating system and a second program; the first operating system receives an enqueue request which is issued by the first program, specifies a first data object, and indicates the start of updating to ensure consistency of the first data object with the first program, and transmits a start marker request that includes information on the first data object to the first storage system; the first operating system receives a dequeue request which is issued by the first program, specifies the first data object, and indicates completion of updating relating to the first data object, and transmits an end marker request that includes information on the first data object to the first storage system; the first storage system receives the plurality of write data, the start marker request and the end marker request, and updates the data stored in the first logical volume using the plurality of write data; the first storage system generates a plurality of transmission data including the plurality of write data, start marker information corresponding to the start marker request, end marker information corresponding to the end marker request, and a plurality of sequence information on the timing of receipt of the plurality of write data, the start marker information and the end marker information; the first storage system transmits the plurality of transmission data to the second storage system asynchronously with the reception of the plurality of write data; the second storage system receives the plurality of transmission data; the second storage system identifies, based on the sequence information, a series of write data included in the plurality of transmission data, relating to a second data object that is a copy of the first data object, and including the plurality of write data received by the first storage system after receipt of the start marker request and before receipt of the end marker request; the second storage system transmits an update start notification that includes information on the second data object to the second computer, in accordance with a judgment that the data stored in the second logical volume is to be updated using a part or all of the series of write data; the second program issues an enqueue request that specifies the second data object to the second operating system, and if the enqueue request is successful, transmits a response to the update start notification to the second storage system via the second operating system; the second storage system starts to update the data stored in the second logical volume using the series of write data, and, when updating of the data stored in the second logical volume is completed, transmits an update completion notification to the second computer; and the second program issues a dequeue request specifying the second data object to the second operating system when the update completion notification is received.

In a tenth aspect, in the ninth aspect the second computer executes a third program, and the second operating system manages the second data object so that reading or writing the data of the second data object by the third program is prevented from receipt of the enqueue request specifying the second data object until receipt of the dequeue request specifying the second data object.

In an eleventh aspect, in the tenth aspect the first computer executes a fourth program, and the first operating system manages the first data object so that reading or writing the data of the first data object by the fourth program is prevented from receipt of the enqueue request specifying the first data object until receipt of the dequeue request specifying the first data object.

In a twelfth aspect, in the tenth aspect the third program issues the enqueue request specifying the second data object to the second operating system, and if the enqueue request is successful, reads data on the second data object, then issues the dequeue request specifying the second data object to the second operating system.

In a thirteenth aspect, in the twelfth aspect the computer system includes a back up storage system, and the third program transmits the data on the second data object to the back up storage system as data in a state that is consistent with the first program.

In a fourteenth aspect, in the thirteenth aspect the first data object is a data unit that can be recognized by the first storage system.

In a fifteenth aspect, in the fourteenth aspect the first data object is data that cannot be recognized by the first storage system, but can be recognized by the first program.

In a sixteenth aspect, in the ninth aspect the second program obtains unused data quantity information on the quantity of write data that has not been used for updating the data stored in the second logical volume, from among the plurality of write data stored in the second storage system, and the second program displays, based on the unused data quantity information, information indicating that the quantity of write data stored in the second storage system exceeds a predetermined threshold for the purpose of waiting for the enqueue request to succeed.

In a seventeenth aspect, in the ninth aspect the first program is configured as a table library management program for converting specified data into data in tape format and managing the data, the first data object is data in tape format that is managed by the first program, and the first storage system transmits the plurality of transmission data to the second storage system in block data format.

In an eighteenth aspect, in the ninth aspect the second program is incorporated into the second operating system.

In a nineteenth aspect, in the ninth aspect a plurality of different first data objects can be provided within the first logical volume.

In a twentieth aspect, in the ninth aspect the first storage system comprises a first transmission data logical volume for storing the plurality of transmission data, and the second storage system comprises a second transmission data logical volume for storing the plurality of transmission data received from the first storage system.

At least a part of the constituent elements of the present invention can be configured as computer programs. The computer programs are fixed in a storage medium and distributed or transmitted via a communication network.

BRIEF DESCRIPTION OF THE DRAWINGS

FIG. 6 is a diagram showing the table for managing the virtual tape library;
FIG. 29 is a flowchart showing the read enqueue reception procedure executed by the DR host;
and
FIG. 30 relates to a second embodiment and is a flowchart showing the procedure executed by the DR host for monitoring unprocessed journal data.

DESCRIPTION OF THE PREFERRED EMBODIMENTS

The following is an explanation of the embodiments of the present invention based on the drawings. In the present embodiment, as described later, so-called asynchronous remote copying is carried out between a storage system 20P on a main site 1P and a storage system 20S on a DR site 1S. When a virtual tape within a primary volume 221P is updated (where updating also includes creation. Likewise below), a host 10P of the copy source creates special journal data indicating the start of the update and separate special journal data indicating completion of the update.

This special journal data indicating start and completion of updating is transmitted to and stored in the storage system 20S on the DR site 1S by asynchronous remote copying, in the same way as normal journal data.

The storage system 20S, which is the copy destination, writes the received journal data received from the storage system 20P, which is the copy source, to a virtual tape in a secondary volume 221S in sequence, so the virtual tape is updated. In this Specification, the process of updating the contents of the virtual tape by writing journal data in sequence is referred to as the "upgrading process".

When the copy destination storage system 20S finds the special journal data indicating update of the primary side virtual tape, use of the virtual tape on the secondary side by a host 10S on the DR site 1S is suppressed. This is because the contents of the virtual tape on the secondary side during the upgrading process is not the same as the contents of the virtual tape on the primary side, so they are inconsistent.

When the copy destination storage system 20S finds special journal information indicating completion of updating, use of the virtual tape on the secondary side by the host 10S is permitted. If special journal data indicating the start of updating is found while the host 10S is using the secondary side virtual tape, the copy destination storage system 20S waits until the use by the host 10S is complete to start the upgrading process.

In this way, the storage system 20S of the DR site 1S prevents use of the virtual tape in the secondary volume 221S only during the period that the virtual tape is being updated, and at all other times use of the virtual tape within the secondary volume 221S is allowed. Therefore, while for example a mission critical task is being executed on the main site 1P, the contents of the virtual tape in the secondary volume 221S can be analyzed, and the contents of the mission critical task can be surveyed, etc.

Embodiment 1

Figure 1:
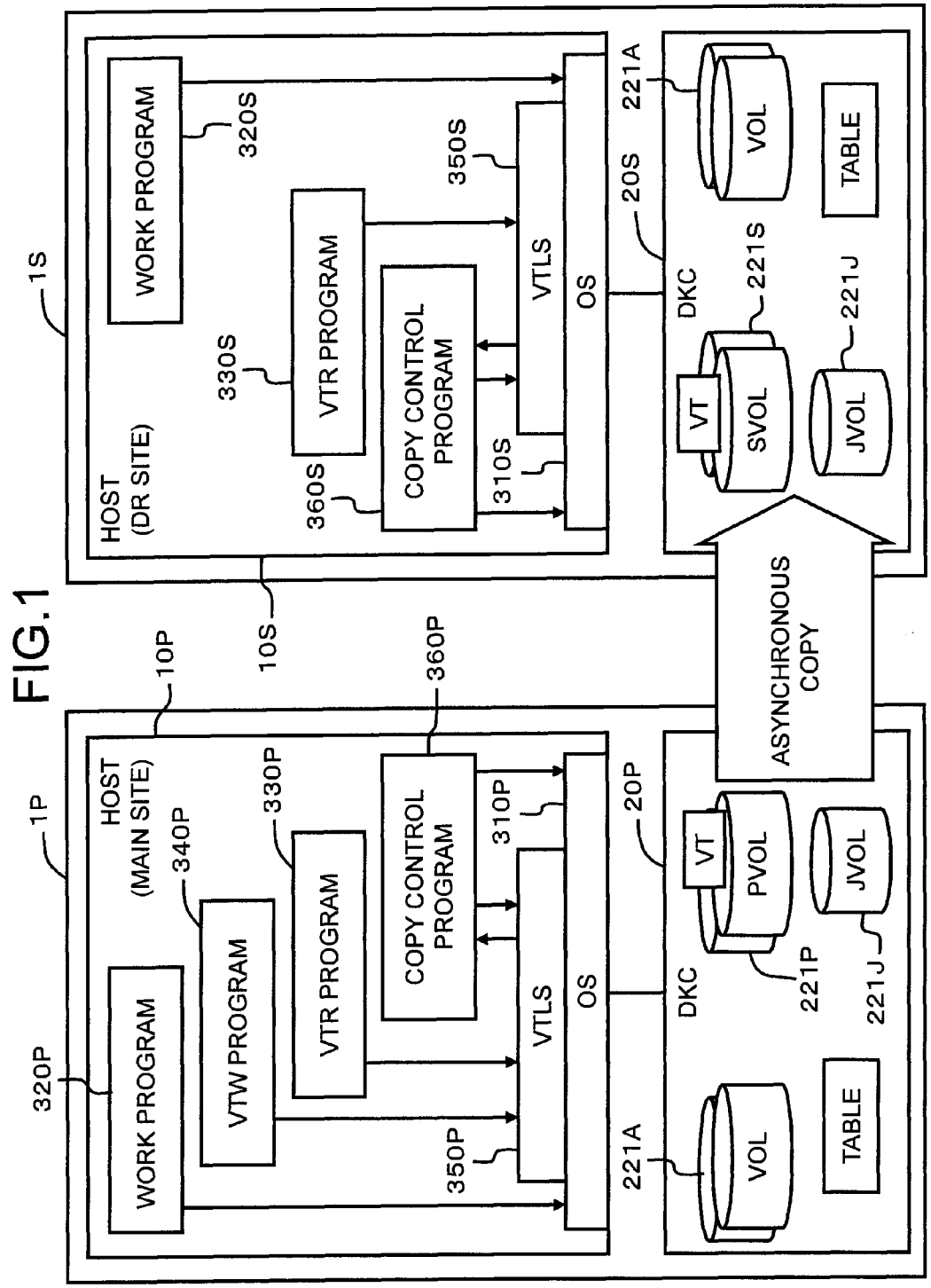
FIG. 1 is a diagram showing an outline of a computer system according to an embodiment of the present invention.
Figure 2:
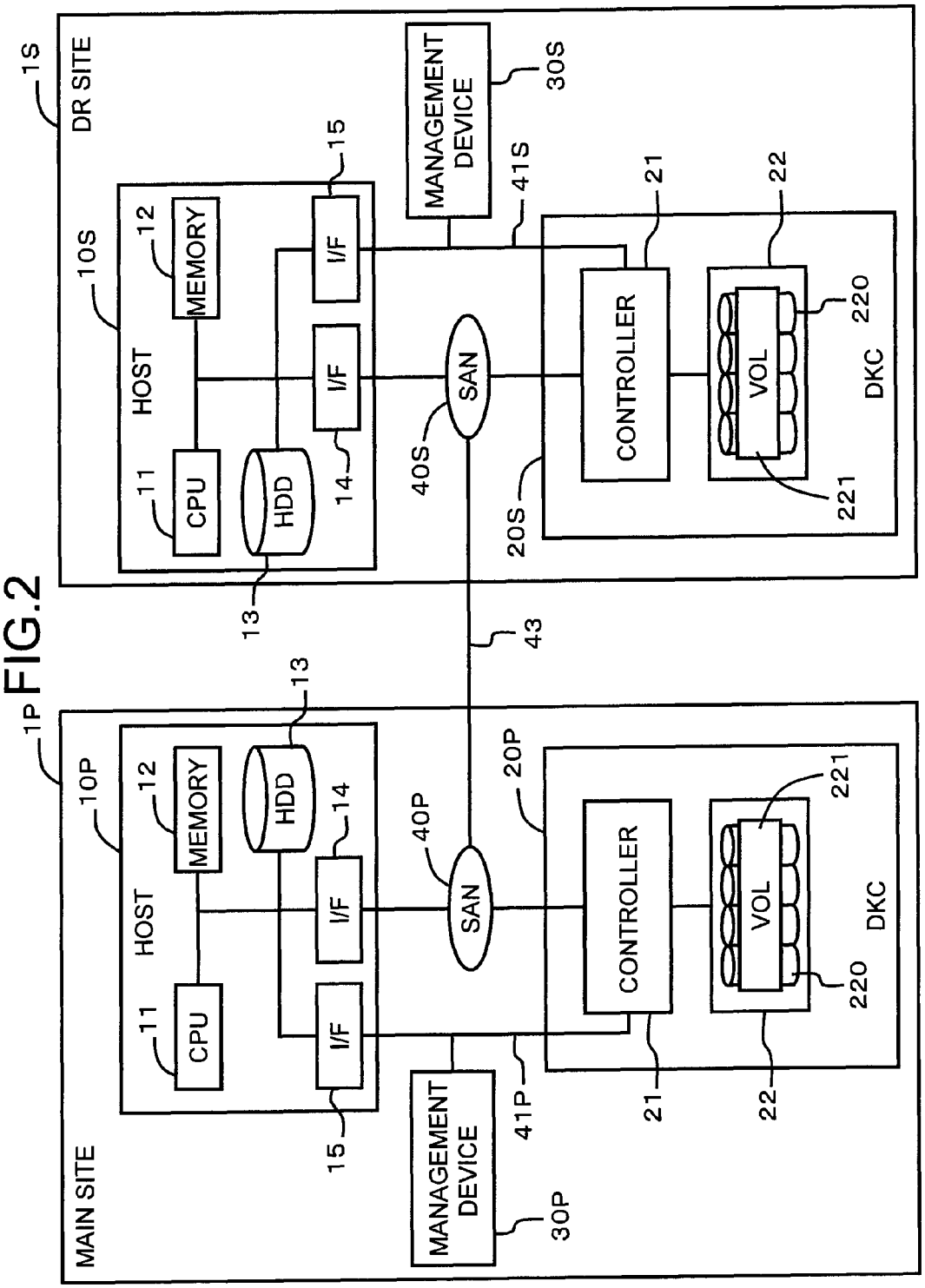
FIG. 2 is a diagram showing the block configuration of the computer system.
Figure 3:
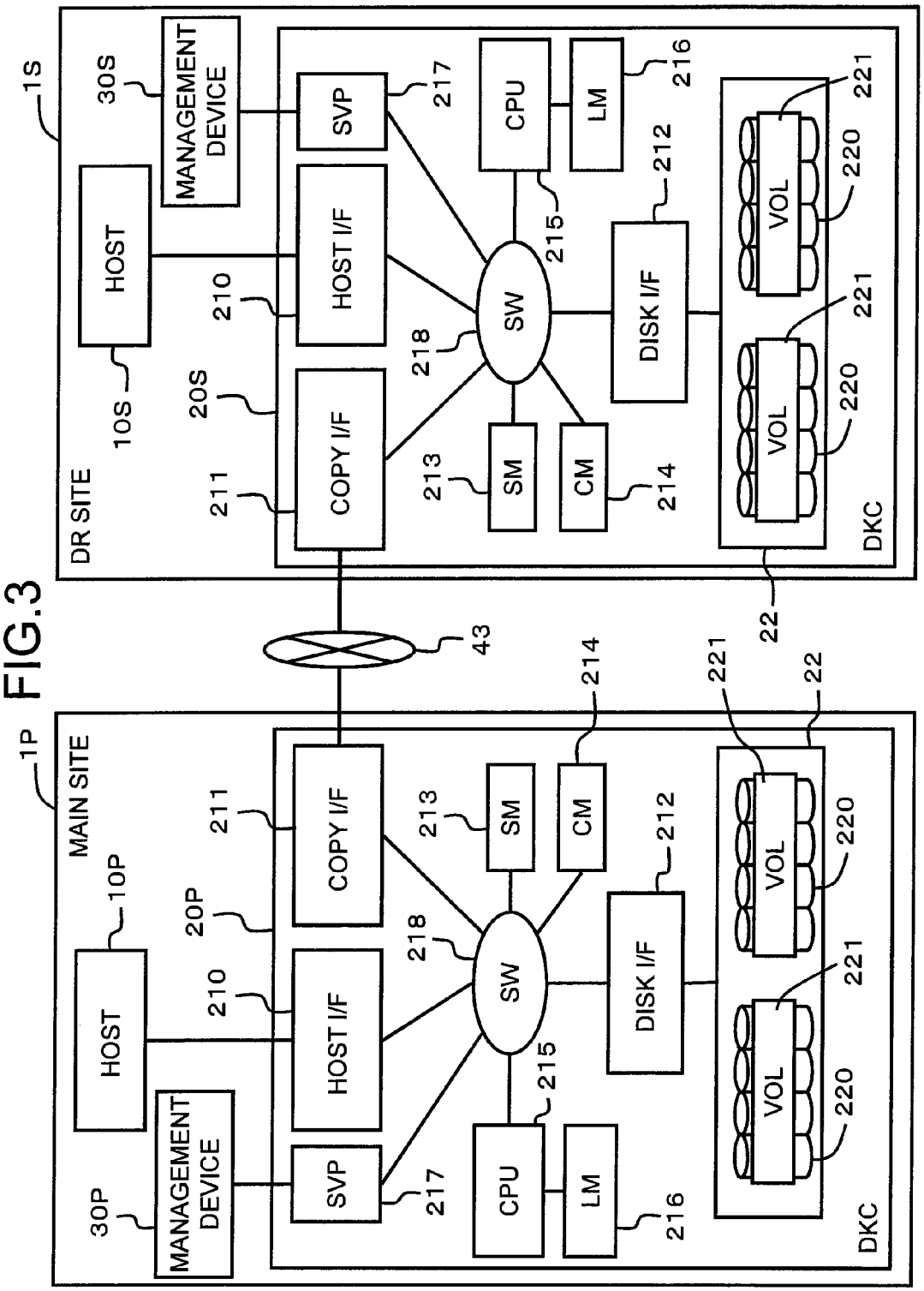
FIG. 3 is a diagram showing the block configuration of the storage system.
Figure 4:
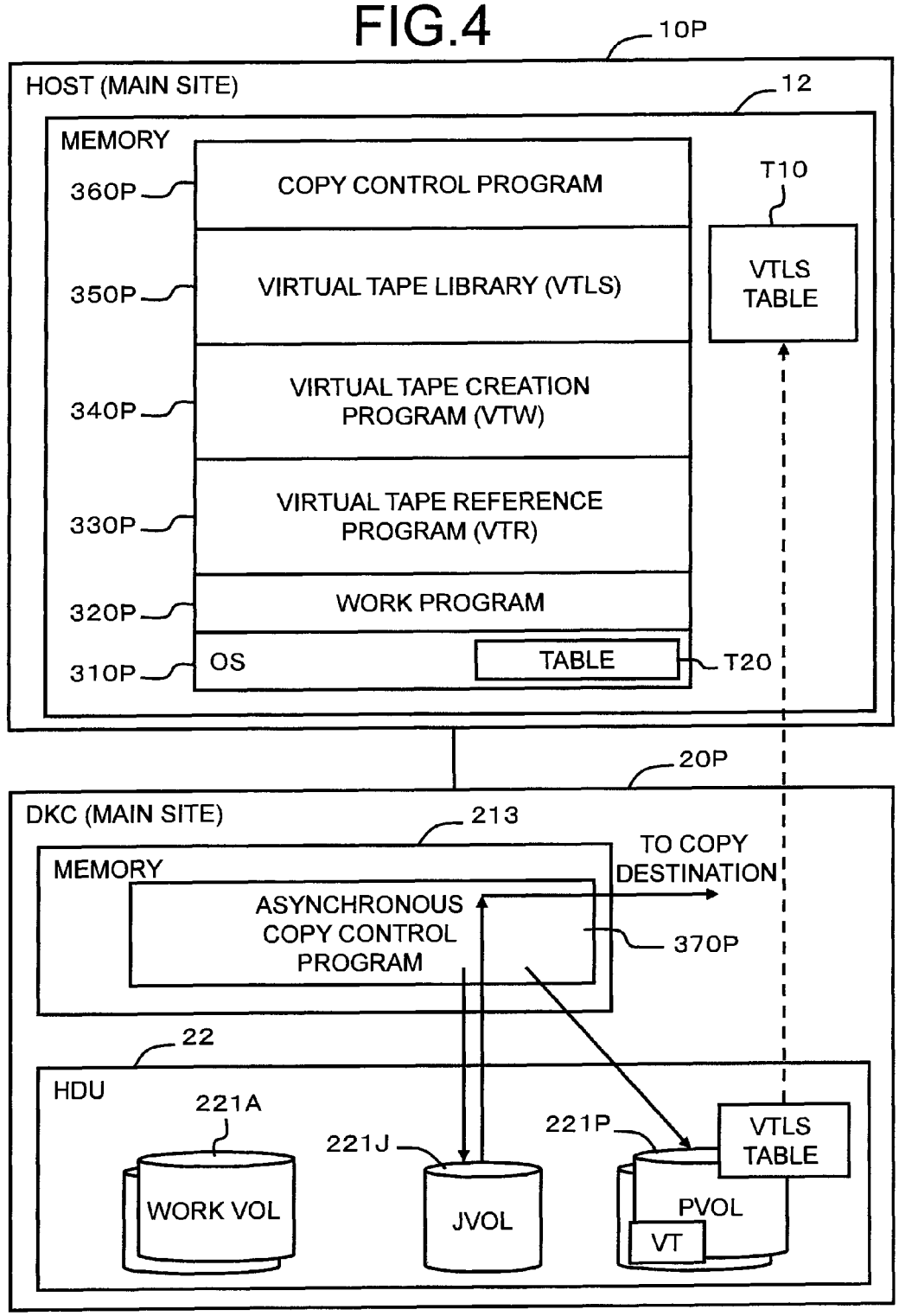
FIG. 4 is a diagram showing the software configuration on the main site side.
Figure 5:
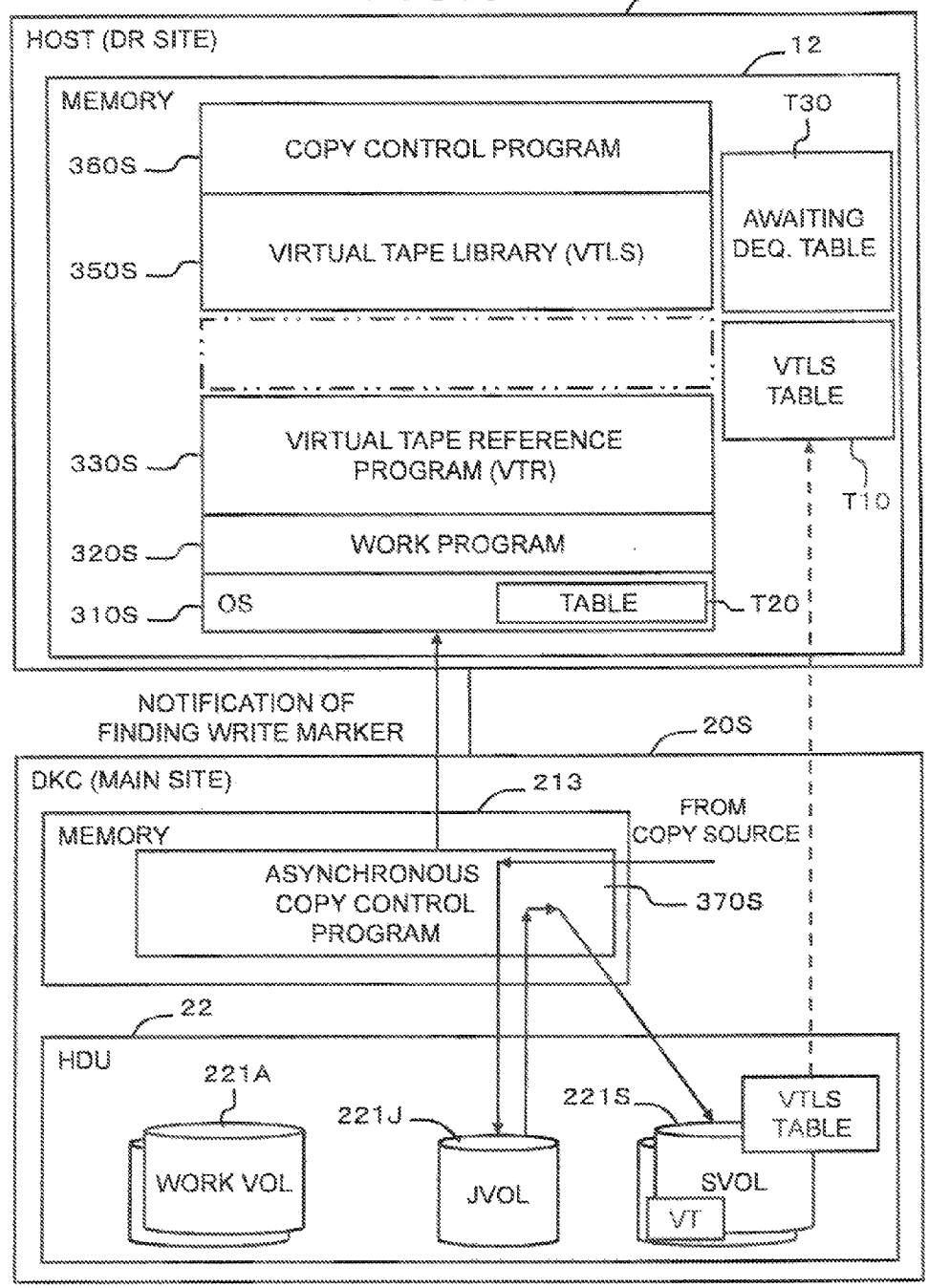
FIG. 5 is a diagram showing the software configuration on the DR site side.

FIG. 1 shows an overall outline of a computer system according to the present embodiment. The hardware configuration of the computer system is shown in FIGS. 2 and 3, and is described later. The software configuration of the computer system is shown in FIGS. 4 and 5, and is described later.

The computer system includes a plurality of sites 1P, 1S, physically located at a distance from each other. One of the sites 1P is the main site that is normally used. The other site 1S is the disaster recovery site (hereafter referred to as the DR site 1S) that is used when the main site 1P is stopped, and the like. The main site 1P can be referred to as the copy source site, or the primary site, or the first site, and the DR site 1S can be referred to as the copy destination site, the secondary site, the second site, or the back up site.

The main site 1P includes the host computer (hereafter referred to as the host) 10P, and the storage system 20P. Likewise, the DR site 1S includes the host 10S and the storage system 20S. In the following explanation, the host 10P on the main site 1P is sometimes referred to as the main host 10P, the storage system 20P on the main site 1P is sometimes referred to as the main storage system 20P or the main storage 20P. Also, the host 10S on the DR site 1S is sometimes referred to as the DR host 10S, and the storage system 20S on the DR site 1S is sometimes referred to as the DR storage system 20S or the DR storage 20S.

The following is an explanation of the configuration of the main site 1P. The main host 10P includes, for example, an operating system (hereafter, OS) 310P, a work program 320P, a virtual tape reference program (hereafter, VTR program) 330P, a virtual tape creation program (VTW program) 340P, a virtual tape library system (hereafter, VTLS) 350P, and a copy control program 360P.

The main storage system 20P includes a logical volume 221A (work volume 221A) for work data used by the work program 320P, a logical volume (primary volume) 221P for storing virtual data, a journal volume 221J for storing journal data, and a table that is described later.

The VTLS 350P converts work data specified by the VTW program 340P into tape format, and stores it in a virtual tape in the primary volume 221P. The VTLS 350P reads data specified by the VTR program 330P from the virtual tape in the primary volume 221P, and supplies it to the VTR program 330P after carrying out a specific conversion.

When the virtual tape in the primary volume 221P is updated by write data from the main host 10P, the main storage system 20P creates journal data on this update, and stores it in the journal volume 221J. The main storage system 20P transmits the journal data accumulated in the journal volume 221J to the DR storage system 20S by asynchronous remote copying.

The following is an explanation of the configuration of the DR site 1S. The DR host 10S includes, for example, an OS 310S, a work program 320S, a VTR program 330S, a VTLS 350S, and a copy control program 360S. The DR host 10S does not have a VTW program for creating or updating virtual tapes. Virtual tapes are entirely created by the main host 10P, and a copy of the virtual tapes is stored in the DR storage system 20S. The DR host 10S can reference the copy of the virtual tape, but cannot update the copy of the virtual tape.

The DR storage system 20S includes a work volume 221A for storing work data, the secondary volume 221S for storing virtual data, a journal volume 221J for storing journal data, and a table that is described later.

The DR storage system 20S stores journal data received from the main storage system 20P in the journal volume 221J. The DR storage system 20S updates the virtual tape stored in the secondary volume 221S based on the journal data accumulated in the journal volume 221J.

The virtual tape is a copy of the virtual tape in the main storage system 20P, as stated above. Therefore, in the following explanation, the virtual tape in the main storage system 20P is sometimes referred to as the primary side virtual tape, and the virtual tape in the DR storage system 20S is sometimes referred to as the secondary side virtual tape.

A program (for example, the work program 320S, or the like) in the DR host 10S can read secondary side virtual tape data, and write the data that has been read to the secondary side work volume 221A. In this way, the stored contents of the primary side work volume 221A and the stored contents of the secondary side work volume 221A are made to be the same.

FIG. 2 shows the hardware configuration of the computer system. In particular FIG. 2 shows an example of the configuration of the hosts 10P, 10S. Here, the main host 10P and the DR host 10S have the same configuration, so the main host 10P is explained.

The main host 10P is configured, for example, as a server computer, and includes a microprocessor (in the figure, CPU: Central processing Unit) 11, a memory 12, an ancillary storage device 13, a communication interface 14 for input/output (I/O), and a communication interface 15 for management. In the figure, interface is abbreviated to "I/F".

Various types of programs that are described later are stored in the memory 12 and the ancillary storage device 13, and these programs are executed on the microprocessor 11. In this way, the various functions for creating a virtual tape and managing a virtual tape library, and so on, are achieved.

The interface 14 for I/O is a communication interface for sending and receiving data to and from the main storage system 20P. The interface 14 for I/O is connected to the main storage system 20P via a communication network 40P such as an Internet Protocol Storage Area Network (IP-SAN), or the like. The on-site communication network 40P is connected to a communication network 40S on the DR site 1S via an inter-site communication network 43. The main storage system 20P sends journal data to the DR storage system 20S via the inter-site communication network 43, or the like.

The communication interface 15 for management is connected to a management communication network 41P, for example a Local Area Network (LAN) or the like. The main host 10P is connected to a management device 30P and the main storage system 20P via the management communication network 41P.

The management device 30P is a computer for managing the main site 1P. The management device 30P includes a user interface for exchanging information with users, such as the system administrator or the like. The user interface includes a device for outputting information and a device for inputting information. The information output device can be, for example, a display device, a sound output device, or the like. The information input device can be, for example, a keyboard switch, a pointing device, a microphone, or the like. The management device 30P and the user interface may be configured to be separable. For example, a configuration in which an administrative terminal for use with the management device 30P is provided separately, and the user interface is provided in the administrative terminal may be used.

The user can set the configuration and so on of the main host 10P and the main storage system 20P, and read various kinds of information from the main host 10P and the main storage system 20P, via the management device 30P.

Similarly, the DR site 1S also is provided with a communication network 40S for I/O, a management communication network 41S, and a management device 30S.

The following is an explanation of the configuration of the storage system 20P, 20S. The main storage system 20P and the DR storage system 20S have the same configuration, so the main storage system 20P is explained.

As shown in FIG. 2, the main storage system 20P includes a controller 21, and a storage device mounting unit (hereafter abbreviated as HDU) 22. The controller 21 controls the operation of the main storage system 20P. The HDU 22 contains a plurality of storage devices, and is controlled by the controller 21.

FIG. 3 shows the hardware configuration of the storage systems 20P, 20S. The controller 21 shown in FIG. 2 includes, for example, a host communication interface (in the figure, Host I/F) 210, a remote copying communication interface (in the figure, Copy I/F) 211, a storage device communication interface (in the figure, Disk I/F) 212, a shared memory (in the figure, SM) 213, a cache memory (in the figure, CM) 214, a microprocessor 215, a local memory (in the figure, LM) 216, a service processor (in the figure, SVP) 217, and a switch (in the figure, SW) 218.

The host communication interface 210 is a control circuit for communicating with the main host 10P, via the I/O communication network 40P. The copying communication interface 211 is a communication circuit for communicating with the DR storage system 20S via the I/O communication network 40P, the inter-site communication network 43, and the I/O communication network 40S. The disk communication interface 212 is a communication circuit for communicating with the storage device 220 within the HDU 22.

The shared memory 213 is a memory area for storing the control information and management information necessary for controlling the main storage system 20P. The cache memory 214 is a memory area for storing write data and the like received from the main host 10P. Further, data for transmission to the DR storage system 20S and data read from the storage device 210 can be stored in the cache memory 214.

In FIG. 3, the shared memory 213 and the cache memory 214 are shown as separate memories, but the present embodiment is not limited to this. A configuration in which in a memory area formed from one or a plurality of memories, and one memory area is used as the shared memory area and another memory area is used as the cache memory area may be used.

The microprocessor 215 controls the operation of the main storage system 20P by, for example, reading in and executing specific control programs. Some of the control information stored in the shared memory 213, for example, is copied to the local memory 216.

The service processor 217 is connected to the management device 30P via the management communication network 41P. The service processor 217 sets the configuration of the main storage system 20P in accordance with instructions from the management device 30P. Further, the service processor 217 collects information indicating the various statuses within the main storage system 20P, and transmits this information indicating the various statuses to the management device 30P. The management device 30P processes the information obtained from the service processor 217, or displays it as it is on a display device in the management device 30P.

The switch 218 is a switch circuit for connecting each of the above circuits 210, 211, 212, 213, 214, 215, 217 together.

The following is an explanation of the HDU 22. The HDU 22 includes a plurality of storage devices 210. The storage device 210 is a storage device from which data can be read or to which data can be written, such as a hard disk device, a semiconductor memory device, an optical disk device, an magneto-optical disk device, a magnetic tape device, or the like.

If a hard disk device is used, it can be, for example, a fiber channel (FC) disk, a Small Computer System Interface (SCSI) disk, a SATA disk, an AT Attachment (ATA) disk, a Serial Attached SCSI (SAS) disk, or the like. Also, for example, a flash memory, a Ferroelectric Random Access Memory (FeRAM), a Magneto-resistive Random Access Memory (MRAM), an Ovonic Unified Memory, a resistance RAM (RRAM), a phase change RAM (PRAM), or the like can be used as the storage device. Further, a configuration in which different types of storage device, such as a flash memory and a hard disk drive, are mixed in the HDU 22 may be used.

Physical storage areas having one or a plurality of storage devices 210 may be grouped, and one or a plurality of logical storage areas may be provided in the grouped storage area. The logical storage area is referred to as the logical volume 221.

FIG. 4 shows the software configuration of the main host 10P and the main storage system 20P. The OS 310P, the work program 320P, the VTR program 330P, the VTW program 340P, the VTLS 350P, the copy control program 360P, a VTLS table T10, and an exclusion control table T20 are stored in a memory 12 in the main host 10P.

The work program 320P is a program for carrying out the user's work, such as for example a customer management program, a sales management program, an electronic mail management program, a video distribution program, or the like.

The VTR program 330P is a program for referencing a virtual tape. The VTW program 340P is a program for creating or updating a virtual tape. The VTLS 350P is a program for managing each virtual tape stored in the primary volume 221P. The VTLS 350P converts work data in the work volume 221A into data in tape form, based on instructions from the VTW program 340P, and writes the data in tape form to a virtual tape in the primary volume 221P. Further, the VTLS 350P reads data from the virtual tape in the primary volume 221P, based on instructions from the VTR program 330P. When necessary, the VTLS 350P converts data in tape format into work data format.

The copy control program 360P is a program for carrying out control regarding remote copying, so that the DR host 10S can directly use the data in the copy destination volume 221S, using asynchronous remote copying. The actual remote copying process is executed by an asynchronous copy control program 370P in the main storage system 20P.

The copy control program 360P is a program that generates information (the write marker as described later) indicating that the virtual tape is being updated, when the virtual tape is updated, and writes the information to the journal volume 221J.

The VTLS table T10 is a table for managing each virtual tape. This is described in detail later. The VTLS table T10 is used for remote copying, and the same VTLS table T10 is used for both the main storage system 20P and the DR storage system 20S.

The asynchronous copy control program 370P is stored in the shared memory 213 (or another memory or storage device 210) of the main storage system 20P. The asynchronous copy control program 370P is a program for executing asynchronous remote copying using block data, that is executed between the main storage system 20P and the DR storage system 20S.

FIG. 5 shows the software configuration of the DR host 10S and the DR storage system 20S. The OS 310S, the work program 320S, the VTR program 330S, the VTLS 350S, the copy control program 360S, a VTLS table T10, an exclusion control table T20, and an awaiting dequeue table (in the figure, DEQ) T30 are stored in a memory 12 in the DR host 10S.

The differences from FIG. 4 are the DR host 10S does not have the VTW program, and is provided with the awaiting dequeue table T30. The DR host 10S analyzes the secondary side virtual tapes and/or the secondary side work data, processes statistics, and so on. For just analyzing the secondary side data, the DR host 10S just has to reference the virtual tape, so it is not necessary to re-write the virtual tape data.

The awaiting dequeue table T30 is a table for managing the virtual tapes that are awaiting cancellation of enqueueing. Further details are provided in FIG. 8.

A program 370S for executing the asynchronous remote copying process between the main storage system 20P and the DR storage system 20S is also stored on the shared memory 213 of the DR storage system 20S.

Here, an example of the corresponding relationship between the constituent elements cited in the scope of the patent claims and the configuration of the embodiment is explained. The "first operating system" corresponds to the OS 310P and the copy control program 360P. The "first program" corresponds to the VTLS 350P. The "second operating system" corresponds to the OS 310S. The "second program" corresponds to the copy control program 360S. The "third program" corresponds to the VTR program 330S. The "fourth program" corresponds to either one or both of the VTR program 330P and the VTW program 340P.

Figure 7:
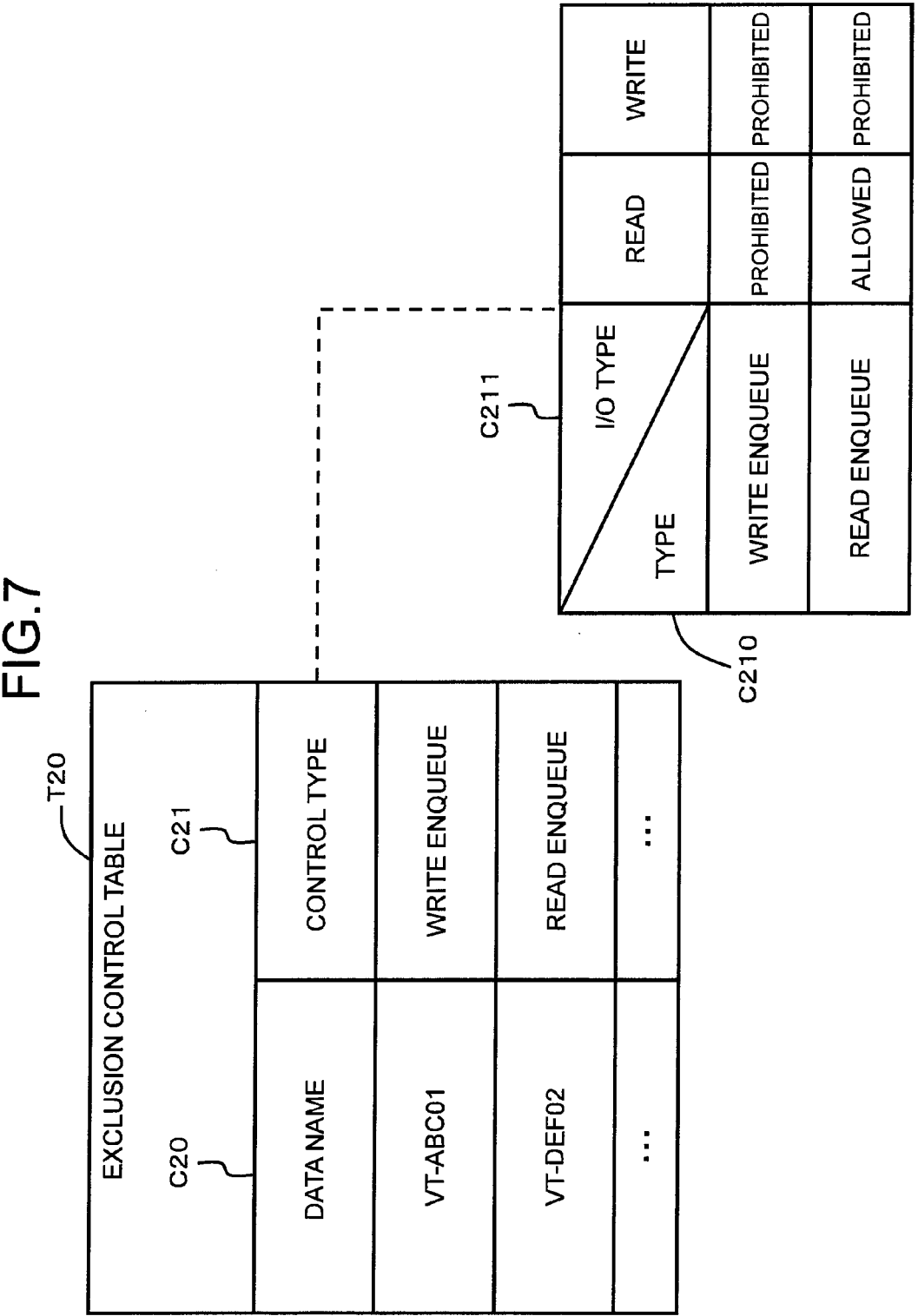
FIG. 7 is a diagram showing the exclusion control table.
Figure 8:
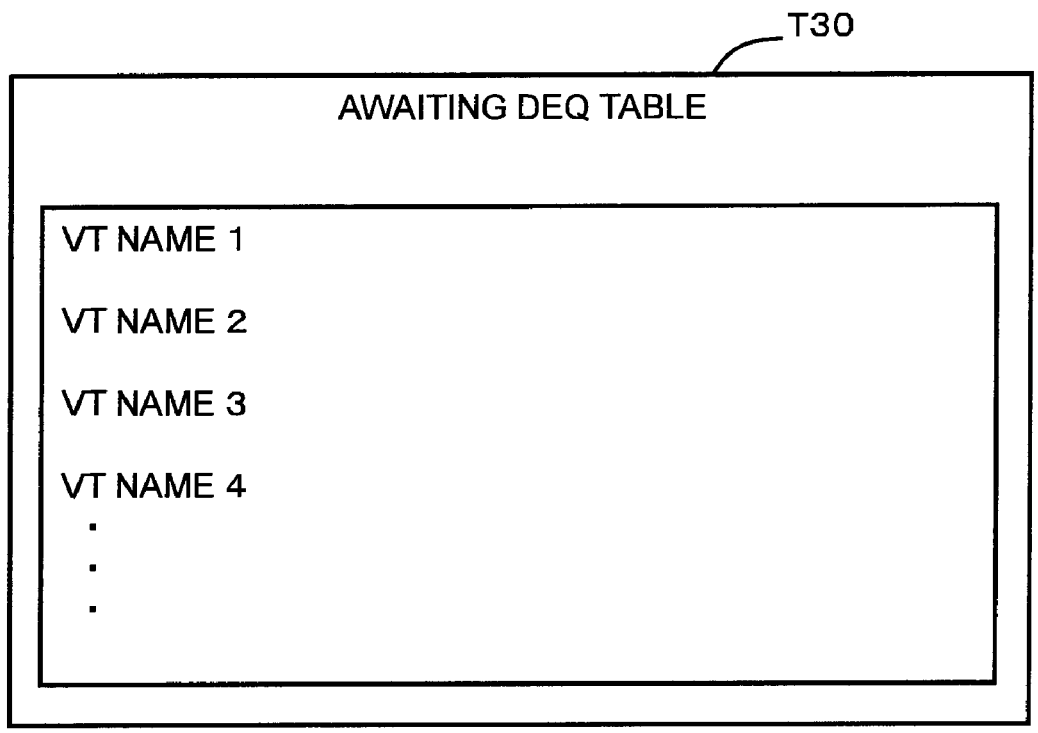
FIG. 8 is a diagram showing the table for managing data waiting for issuing of de-queue.

The following is an explanation of an example of the configuration of the various kinds of information used by the present embodiment, based on FIGS. 6 through 8. In the present embodiment, the various types of information used in the present embodiment are explained using expressions such as for example, "OO table", "OO database", "OO list", "OO queue". However, the various kinds of information used in the present embodiment do not necessarily have to have data structures such as a table, a database, a list, a queue, and other structures are possible. In other words, the various kinds of information used by the present embodiment do not depend on a specific data structure. Also, when explaining the various kinds of information used by the present embodiment, various kinds of expressions are used, such as for example "identification information", "identifier", "ID", "name", and so on, but these various kinds of expressions are interchangeable.

FIG. 6 shows the VTLS table T10. In the figure, virtual tape is shown as VT. The VTLS table T10 manages, for example the virtual tape number C10, the virtual tape name C11, the storage destination C12, and the write marker write destination C13 in association with each other.

The virtual tape numbers C10 are continuous numbers set for each virtual tape. The virtual tape name C11 is information for identifying each virtual tape. The storage destination C12 is information indicating the place where each virtual tape is stored. The storage destination C12 includes, for example, a volume identifier (in the figure, VOL-ID) C120, a start address C121, and an end address C122.

The volume identifier C120 is information for identifying the logical volume in which the virtual tape is stored. The start address C121 indicates the start address in the storage volume where the virtual tape is stored. The end address C122 indicates the end address of the virtual tape.

Using the storage destination C12 which includes each of the items C120 through C122, it is possible to know where and in what logical volume 221 any virtual tape is. As shown in FIG. 6, it is possible to store a plurality of different virtual tapes (VT-ABC01, VT-DEF02) in a single logical volume 221 (VOL1). Further, it is possible to store a single virtual tape (VT-ABC01) in separate locations in the same logical volume 221 (VOL1). Further, it is possible to store a single virtual tape (VT-DEF02) dispersed in a plurality of different logical volumes 221 (VOL1, VOL2).

Even if a certain virtual tape is set to prohibit reading and/or to prohibit writing, another virtual tape in the same logical volume 221 as that virtual tape can be read or written. Each virtual tape is independently managed using the VTLS 350P, 350S.

The write marker write destination C13 is information for managing the write destination of write markers 410 (see FIG. 10), which are described later. The write marker write destination C13 includes, for example, a volume identifier C130, a start address C131, and an end address C132.

The volume identifier C130 is information for identifying the logical volume where the write marker 410 is stored. The start address C131 indicates the start address of the write marker 410. The end address C132 indicates the end address of the write marker 410. Using the write marker write destination C13 which includes each of the items C130 through C132, it is possible to know where and in what logical volume 221 any write marker 410 is.

FIG. 7 shows the exclusion control table T20. The exclusion control table T20 is a table for controlling access to specific data (virtual tape). The exclusion control table T20 includes, for example, a data name C20, and a control type C21. The data name C20 is information for specifying the data that is subject to access control. The control type C21 is information indicating the type of access control to that data.

The control type C21 includes, for example, write enqueue and read enqueue. The relationship between the type C210 indicating either write enqueue or read enqueue and the I/O type C211 of that data is shown in FIG. 7, and is as follows.

If the data is set to write enqueue, both read access and write access to the data is prohibited. In other words, both reading and updating the data is prohibited.

If the data is set to read enqueue, read access to the data is permitted, but write access is prohibited. In other words, the data is write protected.

If a virtual tape is to be updated, the virtual tape is set to write enqueue. A virtual tape that is set to write enqueue can only be accessed by the program that desires to update the virtual tape, and other programs cannot access it.

In contrast, when it is desired that other programs can reference the virtual tape, the virtual tape is set to read enqueue. The program that wants to reference the virtual tape and other programs can read data from a virtual tape that is set to read enqueue. Programs other than the referencing program can reference a virtual tape that is set to read enqueue, but cannot update the virtual tape.

Focusing on the above functions, read enqueue and write enqueue are access control information for controlling access to the data. Further, write enqueue is referred to as first access control information for prohibiting referencing and updating the data by a program other than a write source program. Read enqueue is referred to as second access control information for prohibiting updating and allowing referencing the data.

FIG. 8 shows the awaiting dequeue table T30. Dequeue is information for canceling enqueue. For example, other programs are prohibited from referencing or updating a virtual tape that is set to write enqueue until a dequeue is issued to cancel the enqueue.

The awaiting dequeue table T30 is a table for managing virtual tapes that are awaiting issuing a dequeue. Therefore, the name of virtual tapes that are awaiting dequeue are stored in the awaiting dequeue table T30.

Figure 9:
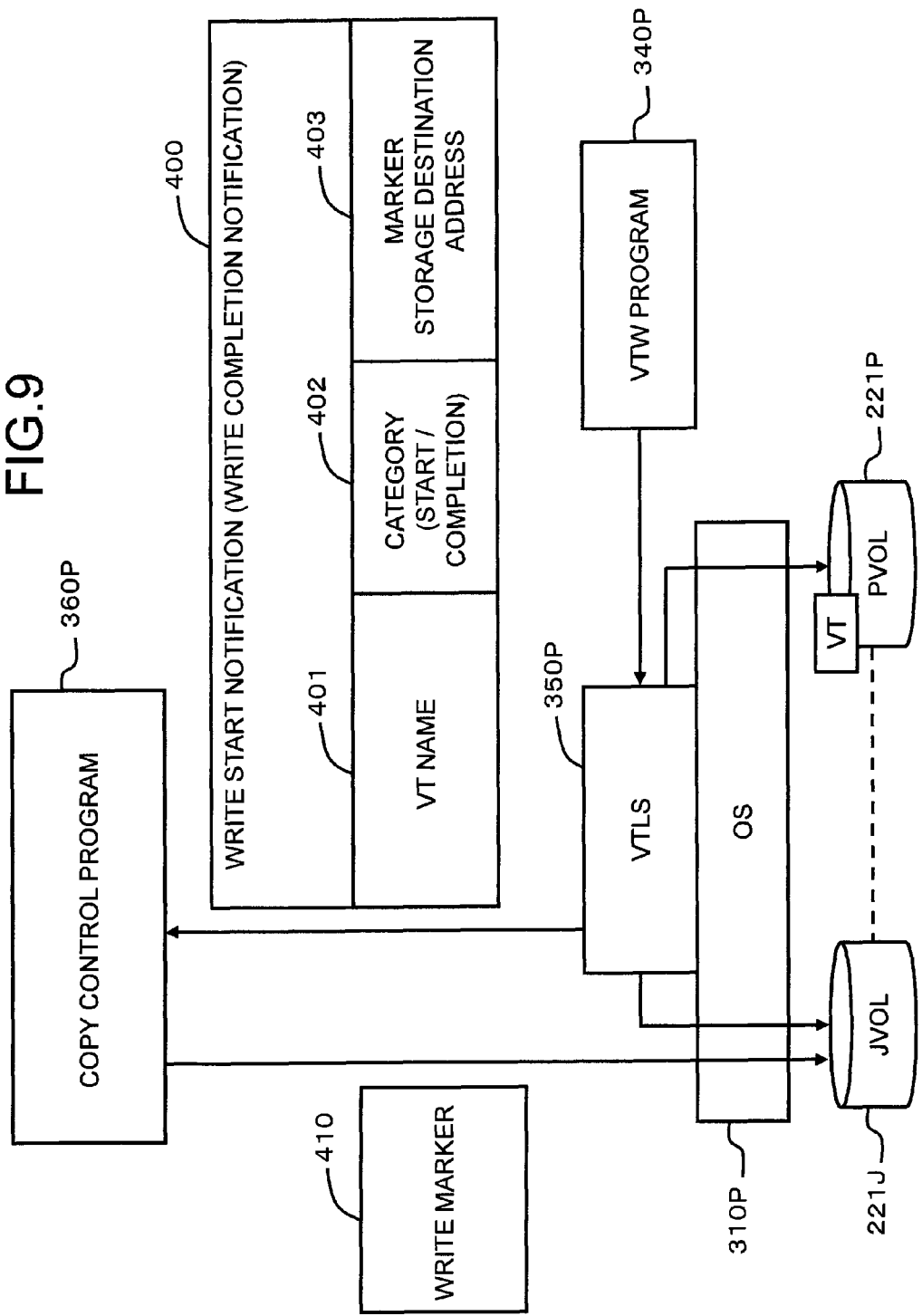
FIG. 9 is a diagram showing the relationship between the copy control program, the virtual tape library, and the operating system in the main site.

FIG. 9 schematically shows the relationship between the copy control program 360P, the VTLS 350P, the OS 310P, and so on, in the main host 10P. When updating a virtual tape in the primary volume 221P, the VTW program 340P specifies the name of the virtual tape to be updated, and gives an update instruction to the VTLS 350P.

After receiving the update instruction from the VTW program 340P, the VTLS 350P issues a write start notification 400 to the copy control program 360P. The write start notification 400 is information indicating the start of updating the virtual tape. The write start notification 400 includes, for example, the virtual tape name 401, a category 402 indicating whether the process is starting (enqueue) or completed (dequeue), and a marker storage destination address 403. The marker storage destination address 403 is information indicating the storage location of a write marker 410 created by the copy control program 360P.

After receiving the write start notification 400, the copy control program 360P creates the write marker 410 based on the write start notification 400. The copy control program 360P hands over the write marker 410 to the OS 310P, and instructs the OS 310P to write the write marker 410 in the specified storage location (the marker storage destination address 403).

Here, the write marker 410 for informing the DR storage system 20S of the start of updating is referred to as the write start marker. The write marker 410 for informing the DR storage system 20S of the completion of updating is referred to as the write completion marker. Write marker is a general term that includes both write start marker and write completion marker.

The OS 310P writes the write marker in the specified location (here, at the specified address in the journal volume 221J). Then, the VTLS 350P converts the write data (work data) received from the VTW program 340P into tape format data, then the OS 310P writes the tape format data to a virtual tape in the primary volume 221P. Further, the VTLS 350P creates journal data based on the write data written to the virtual tape, and the journal data is stored in the journal volume 221J by the OS 310P.

When updating the virtual tape is completed, the VTLS 350P creates a write completion notification, and transmits it to the copy control program 360P. The write completion notification has the same structure as the write start notification, the only difference is the value that the category 402 is set to.

After receiving the write completion notification, the copy control program 360P creates a write completion marker to indicate that the updating process has been completed. The write completion marker is written to the journal volume 221J via the OS 310P.

In this way, when the virtual tape VT in the primary volume 221P is updated, a write start marker indicating the start of updating and a write completion marker indicating completion of updating are created and stored in the journal volume 221J. The write start marker and the write completion marker are transmitted to and stored in the DR storage system 20S together with normal journal data.

Figure 10:
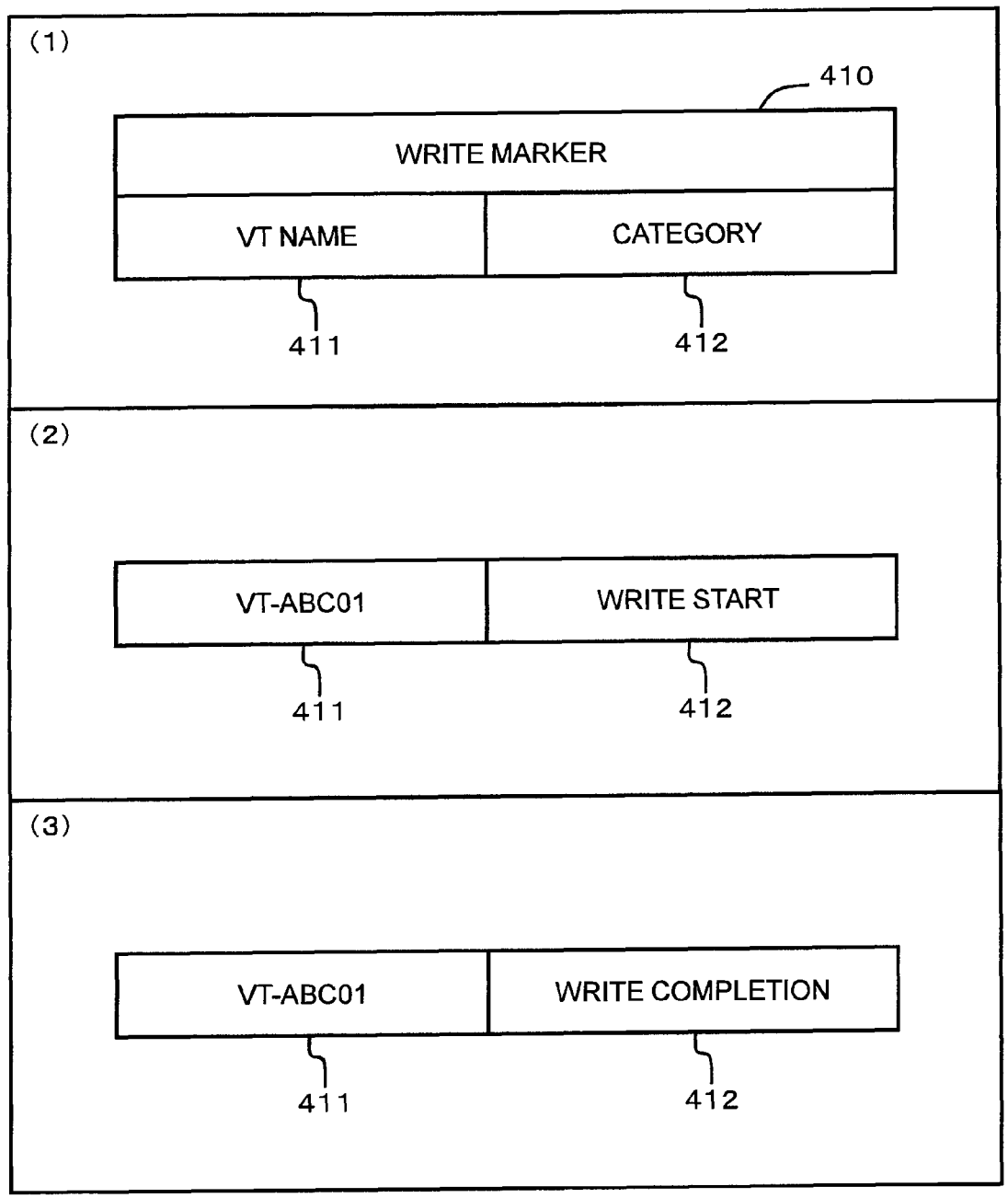
FIG. 10 is a diagram showing the configuration of the write marker.

FIG. 10 shows the structure of the write marker 410. As shown in FIG. 10(1), the write marker 410 includes a virtual tape name 411 for specifying the virtual tape containing the data, and a category 412 to indicate either start of updating or completion of updating.

As shown in FIG. 10(2), in a write start marker, the category 412 is set to "write start". As shown in FIG. 10(3), in a write completion marker, the category 412 is set to "write completion". For ease of explanation, "write start" and "write completion" have been shown as if they were character codes, but in reality it is possible to distinguish between write start and write completion by setting to either one of "1" or "0".

Figure 11:
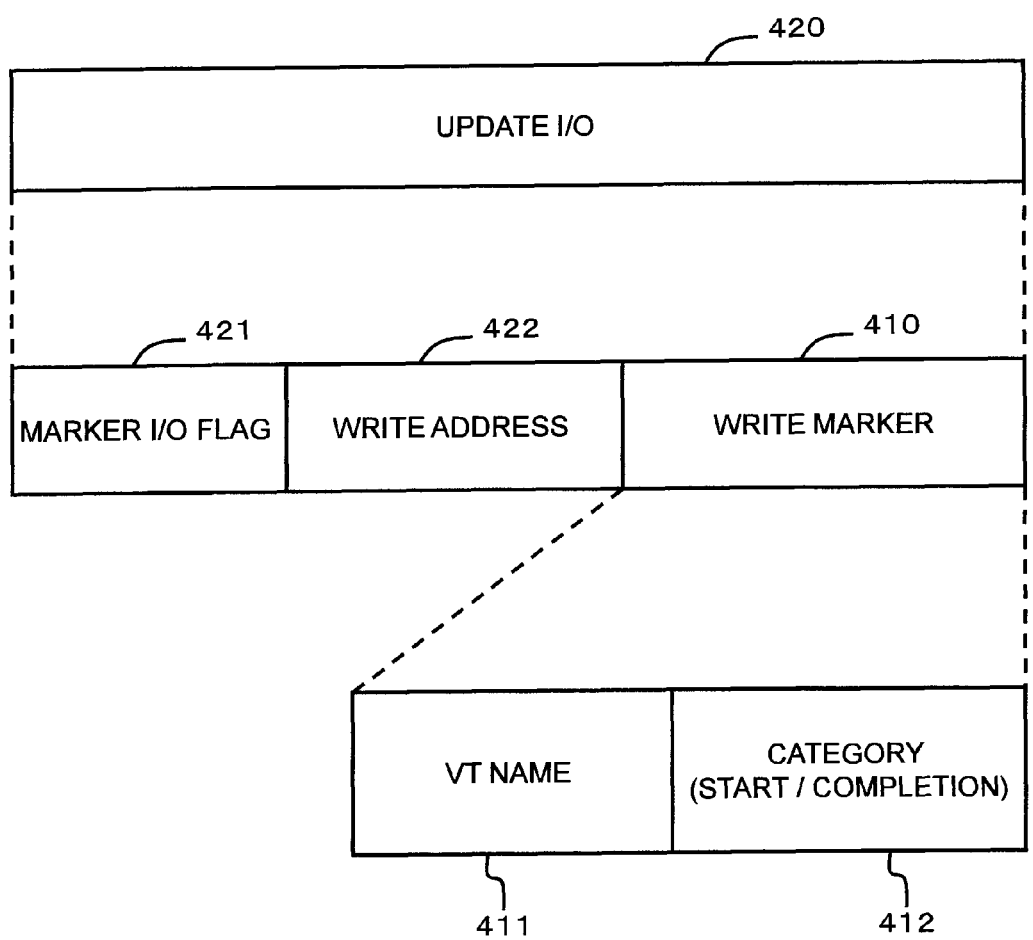
FIG. 11 is a diagram showing the structure of the data sent from the copy control program to the operating system when starting to update or when completing updating.

FIG. 11 shows the structure of an update I/O 420 created by the copy control program 360P and handed over to the OS 310P. After receiving the write start notification 400 or the write completion notification 400 from the VTLS 350P, the copy control program 360P creates a write start marker or a write completion marker, and requests the OS 310P to write these markers. An update I/O 420 created when requesting that these be written is shown in FIG. 11.

The update I/O 420 includes, for example, a marker I/O flag 421, a write destination address 422, and the write marker 410 which is the data to be written. The marker I/O flag 421 is information indicating that the update I/O 420 is an I/O for requesting that the write marker 410 be written, and that it is different from the normal write data. In other words, the marker I/O flag 421 is information to distinguish the write marker from normal write data. The write destination address 422 is information specifying the storage area where the write marker 410 should be written. The write marker 410 is the data that is to be written.

The following is an explanation of the operation of the present embodiment, based on FIGS. 12 through 29. First, to understand the present embodiment an outline of the overall operation is explained, based on FIGS. 12 through 14, then the details of each individual procedure is explained. The outline shown in FIGS. 12 through 14 was prepared to aid understanding the present embodiment, and it is not the intention that the scope of the present invention be limited to the scope indicated in FIGS. 12 through 14.

In the following explanation, for convenience the host or the function part achieved by the computer program is used as the grammatical subject. Computer programs achieve their specific functions by being read into the microprocessor, and by using hardware resources such as communication interfaces as appropriate. Therefore, the operation of the computer system according to the present embodiment can be explained using either the computer program or the function part achieved by the computer program as the grammatical subject. A part or all of a computer program may be realized using a hardware circuit.

Figure 12:
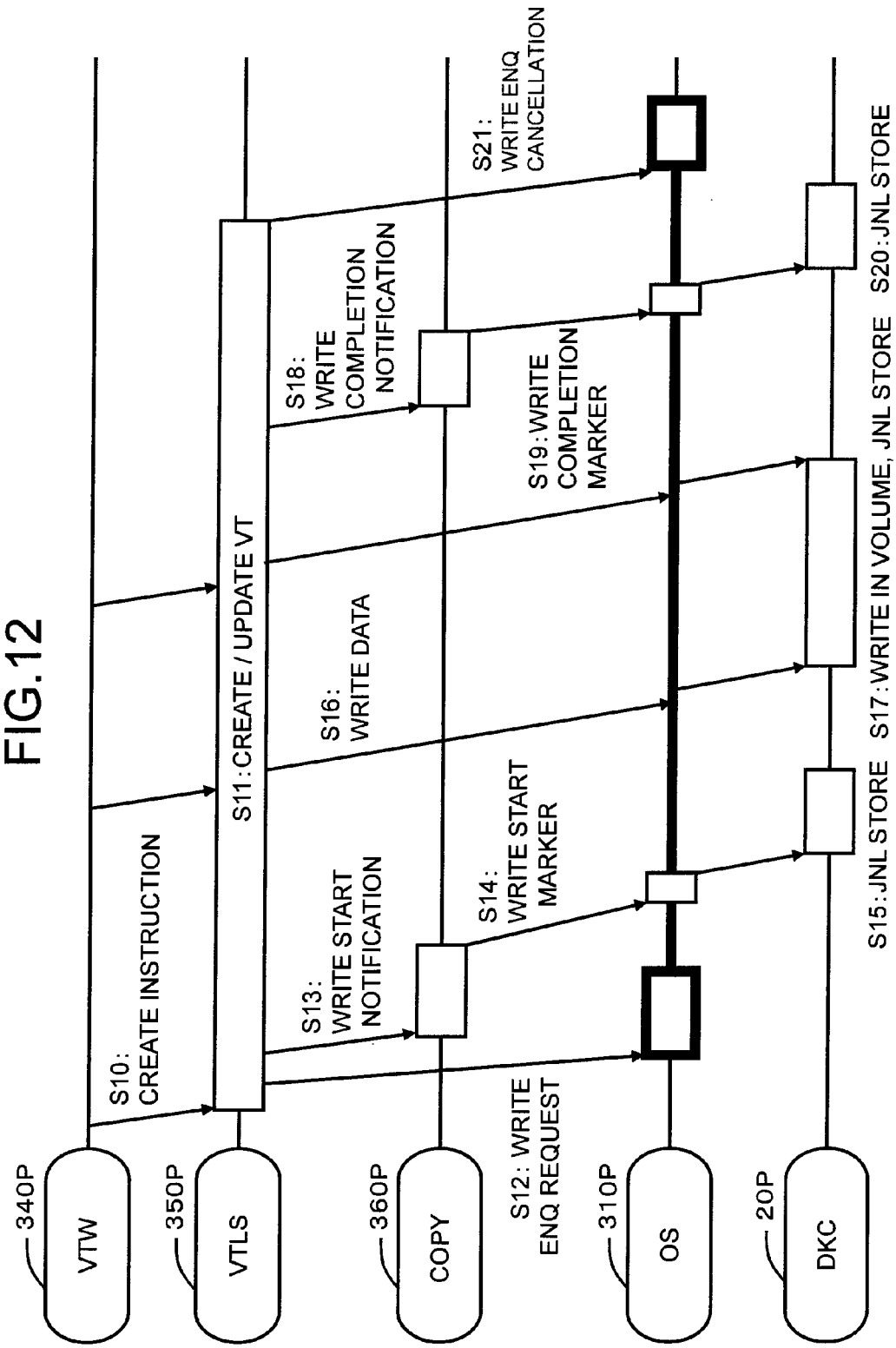
FIG. 12 is a flowchart showing an outline of the procedure when starting to update.

FIG. 12 shows an outline of the procedure to update a virtual tape in the main site 1P. ACK responses and other detailed steps are omitted from the figure.

To update a virtual tape, the VTW program 340P specifies the name of the virtual tape to be updated, and requests the VTLS 350P to carry out the update (S10). In the following, "update" refers to both creation and updating.

After receiving the instruction from the VTW program 340P, the VTLS 350P specifies the virtual tape name, and requests the OS 310P to obtain a write enqueue (S12). If the specified virtual tape is not being used by another program, the OS 310P sets a write enqueue for the virtual tape. In this way, other programs can neither reference nor update the virtual tape. In other words, exclusively only the VTLS 350P can use the virtual tape. The state in which the virtual tape is being used exclusively is indicated on FIGS. 12 through 14 with a thick line.

After confirming that the write enqueue has been obtained, the VTLS 350P transmits a write start notification 400 to the copy control program 360P (S13). The copy control program 360P creates a write start marker 410, and hands it over to the OS 310P (S14). The OS 310P sends the received write start marker 410 to the main storage system 20P.

The main storage system 20P applies a time stamp to the received write start marker 410, and stores it in the journal volume 221J (S15). The time stamp corresponds to "sequence information". Instead of a time stamp, a continuous number indicating the sequence of writing may be used.

When the VTLS 350P confirms that the write start marker 410 has been issued, the VTLS 350P converts the work data received from the VTW program 340P into tape format data, and transmits the tape format data to the OS 310P as write data (S16).

The OS 310P transmits the write data to the main storage system 20P. The main storage system 20P writes the received write data onto the virtual tape in the primary volume 221P (S17). Further, the main storage system 20P applies a time stamp to the received write data, creates journal data, and stores the journal data in the journal volume 221J (S17).

When updating the virtual tape is complete, the VTLS 350P creates a write completion notification 400 and sends it to the copy control program 360P (S18). The copy control program 360P creates a write completion marker 410 and sends it to the OS 310P (S19). The OS 310P transmits the write completion marker 410 to the main storage system 20P. The main storage system 20P applies a time stamp to the write completion marker 410 and stores it in the journal volume 221J (S20).

After confirming that the write completion marker 410 has been issued, the VTLS 350P requests the OS 310P to cancel the write enqueue (S21). In this way, updating of the virtual tape is completed, and exclusive control is cancelled. Other programs on the main host 10P can reference or update the virtual tape.

Figure 13:
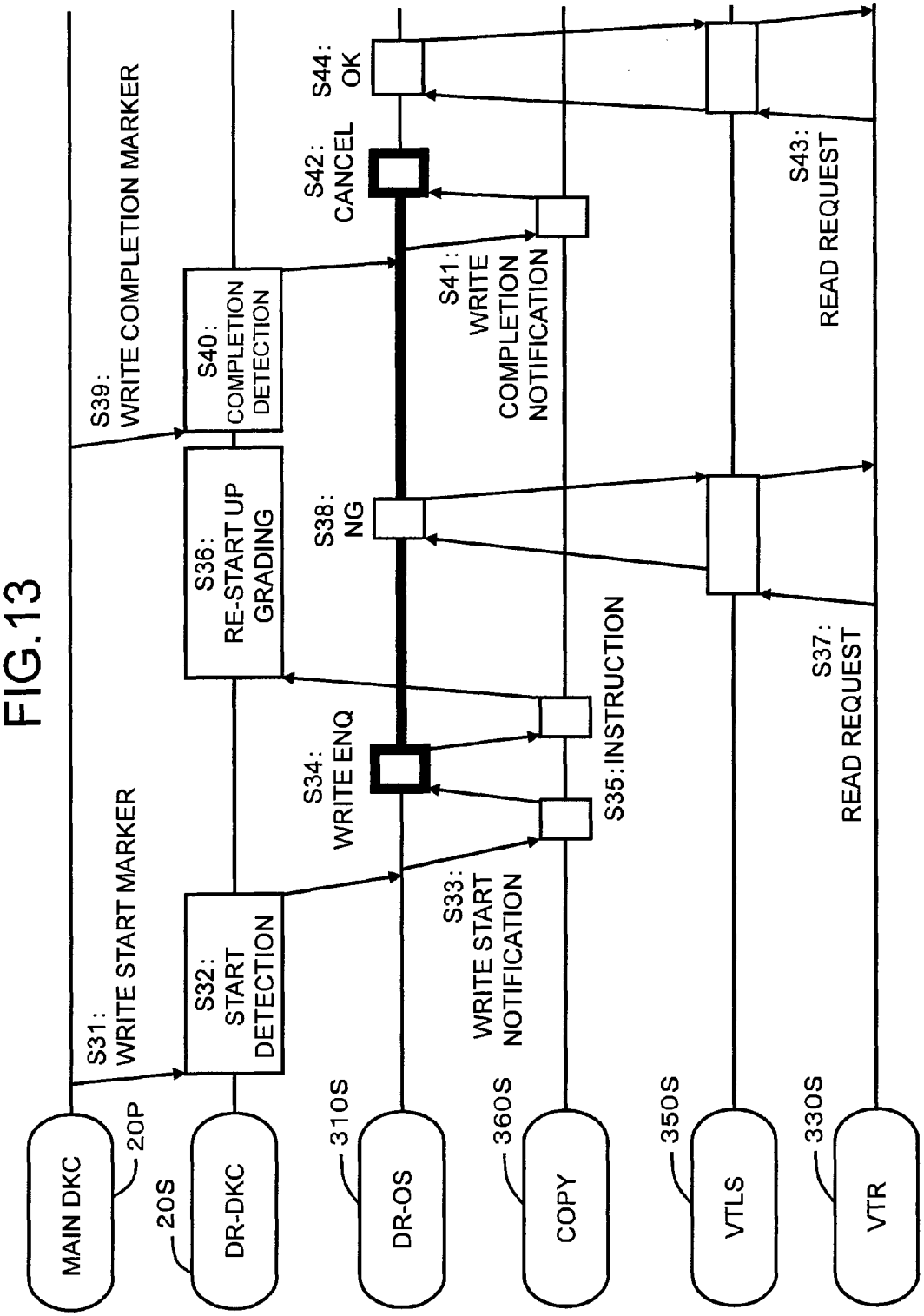
FIG. 13 is a flowchart showing an outline of the process to update a virtual tape within a secondary volume.

FIG. 13 shows the procedure for updating the secondary side virtual tape on the DR site 1S, using the journal data received from the main site 1P. The journal data is transmitted from the main storage system 20P to the DR storage system 20S by the asynchronous copying method. The journal data also includes the write start marker 410 (S31).

The DR storage system 20S extracts one by one the journal data accumulated in the journal volume 221J (in the following explanation of FIG. 13, the journal volume 221J indicates the journal volume in the DR storage system 20S), and starts the upgrade process (the process of updating the virtual tape).

When the journal data extracted by the DR storage system 20S from the journal volume 221J is a write start marker 410 (S32), the DR storage system 20S notifies the OS 310S of the DR host 10S that a write start marker 410 has arrived. The upgrading process of the virtual tape is temporarily stopped.

The OS 310S notifies the copy control program 360S of the arrival of the write start marker (S33). The copy control program 360S specifies the secondary side virtual tape that is to be updated to the OS 310S, and requests that a write enqueue be obtained (S34).

When the OS 310S sets the write enqueue for the virtual tape, the copy control program 360S instructs the DR storage system 20S to re-start the upgrading process (S35). The re-start instruction is transmitted to the DR storage system 20S via the OS 310S. After receiving the instruction to re-start, the DR storage system 20S reads the journal data from the journal volume 221J, and writes it to the virtual tape in the secondary side volume 221S in the order that it was created (S36).

After the write enqueue is set for the virtual tape, if for example the VTR program 330S requests the VTLS 350S to reference the virtual tape (S37), the OS 310S refuses this reference request (read request) (S38). This is because the write enqueue has already been set for the virtual tape, so both referencing and updating are prohibited.

The write completion marker 410 is transmitted from the main storage system 20P to the DR storage system 20S, and stored in the journal volume 221J (S39). When the DR storage system 20S detects the write completion marker 410 (S40), the DR storage system 20S notifies the OS 310S.

The OS 310S notifies the copy control program 360S that the write completion marker 410 has been detected (S41). The copy control program 360S requests the OS 310S to cancel the write enqueue. The OS 310S terminates the exclusive control of the secondary side virtual tape that was subject to exclusive control (S42). In other words, the OS 310S cancels the write enqueue.

Then, when the VTR 330S requests to read data from the secondary side virtual tape (S43), the OS 310S issues a read I/O to the DR storage system 20S in accordance with the request.

In this way, in the present embodiment, while the upgrade process (updating process) is being executed on the secondary side virtual tape, the use of the data in the virtual tape is prohibited, but when the upgrading process is not being executed the use of the data in the virtual tape is permitted. Therefore, programs on the DR host 10S can analyze the data on the virtual tape and survey the status of mission critical tasks, and so on, during the permitted period.

Figure 14:
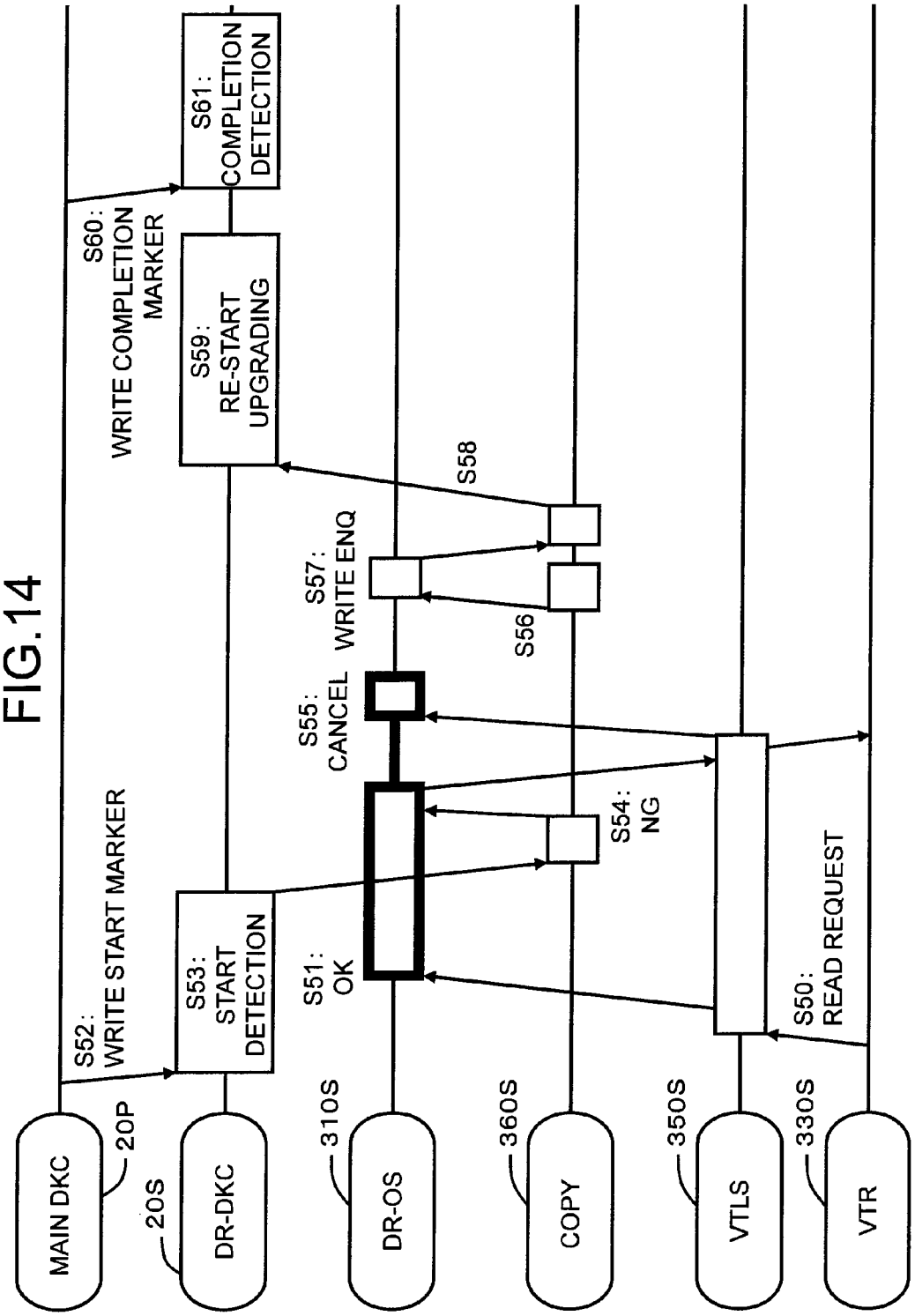
FIG. 14 is a flowchart showing an outline of the case where prior to starting to update a virtual tape within a secondary volume, the virtual tape is being used by another program.

FIG. 14 shows the procedure for the case where before the start of the upgrade process for a secondary side virtual tape on the DR site 1S, another program 330S is using the virtual tape.

As shown in the lower part of FIG. 14, the VTR program 330S requests the VTLS 350S to reference the secondary side virtual tape (S50). The VTLS 350S requests a read enqueue for the virtual tape to the OS 310S. The OS 310S sets a read enqueue for the virtual tape (S51). In this way, the virtual tape is permitted to be read only, and updating is prohibited.

Then, a write start marker 410 is transmitted from the main storage system 20P to the DR storage system 20S as part of the journal data (S52), and the DR storage system 20S detects that the write start marker 410 has arrived (S53). At the time that the write start marker 410 is detected, the upgrading process is temporarily stopped.

The DR storage system 20S notifies the copy control program 360S via the OS 310S that the write start marker 410 has arrived. The copy control program 360S requests the OS 310S to set a write enqueue for the specified virtual tape. However, in step S51 a read enqueue was set for the virtual tape by the VTR program 330S. Therefore, the OS 310S responds that setting the write enqueue from the copy control program 360S has failed (S54).

In other words, if the virtual tape is being used by another program first, the upgrading process of the virtual tape cannot be carried out until the use by the other program is finished, so the upgrading process is placed on standby.

Then, when referencing the virtual tape by the VTR program 330S is finished, the OS 310S cancels the read enqueue for the virtual tape (S55). The copy control program 360S again requests the OS 310S to obtain a write enqueue for the virtual tape (S56). The OS 310S sets the write enqueue for the virtual tape (S57).

When the copy control program 360S confirms that the write enqueue has been obtained for the virtual tape, the copy control program 360S instructs the DR storage system 20S to re-start the upgrading process (S58). After receiving the instruction to re-start, the DR storage system 20S re-starts the upgrading process of the virtual tape (S59). Then, when the write termination marker 410 is detected (S60, S61), the write enqueue is cancelled for the virtual tape.

Figure 15:
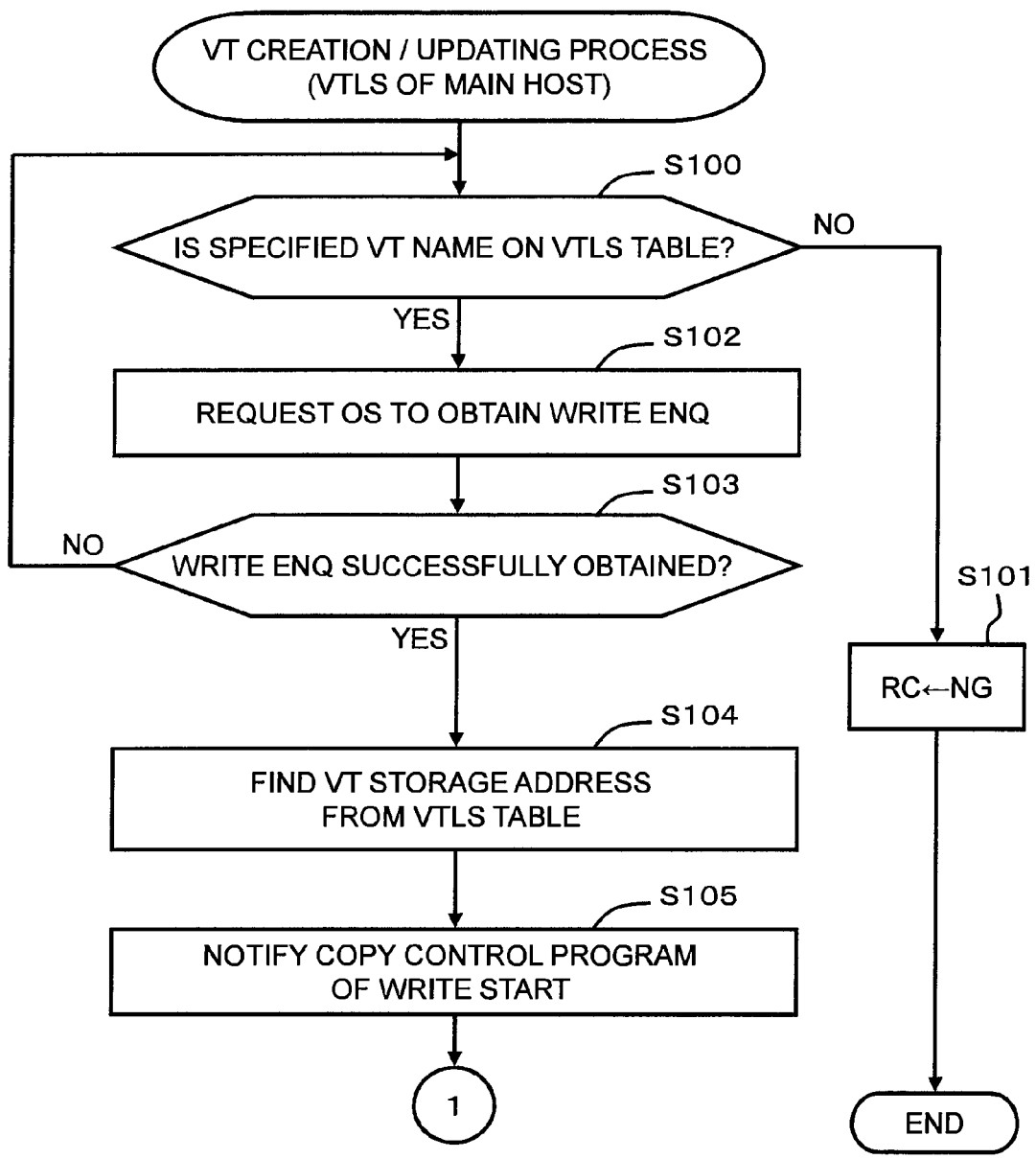
FIG. 15 is a flowchart of the procedure for creating or updating a virtual tape, that is executed by the main host (the host computer at the main site)

FIG. 15 is a flowchart showing the creation or updating process of a virtual tape, executed by the VTLS 350P on the main host 10P. The VTLS 350P determines whether or not the virtual tape name specified by the VTW program 340P is listed on the VTLS table T10 (S100).

If the specified virtual tape name is not listed on the VTLS table T10 (S100: NO), the VTLS 350P notifies the VTW program 340P that the procedure has failed (S101), and the main procedure is terminated.

If the specified virtual tape name is listed on the VTLS table T10 (S100: YES), the VTLS 350P requests the OS 310P to obtain a write enqueue for the specified virtual tape (S102). The VTLS 350P waits until obtaining the write enqueue is successful (S103).

If the OS 310P succeeds in obtaining the write enqueue (S103: YES), the VTLS 350P obtains the information C12 indicating the storage address of the virtual tape from the VTLS table T10 (S104). The VTLS 350P creates a write start notification 400, and notifies the copy control program 360P of the start of updating (S105).

Figure 16:
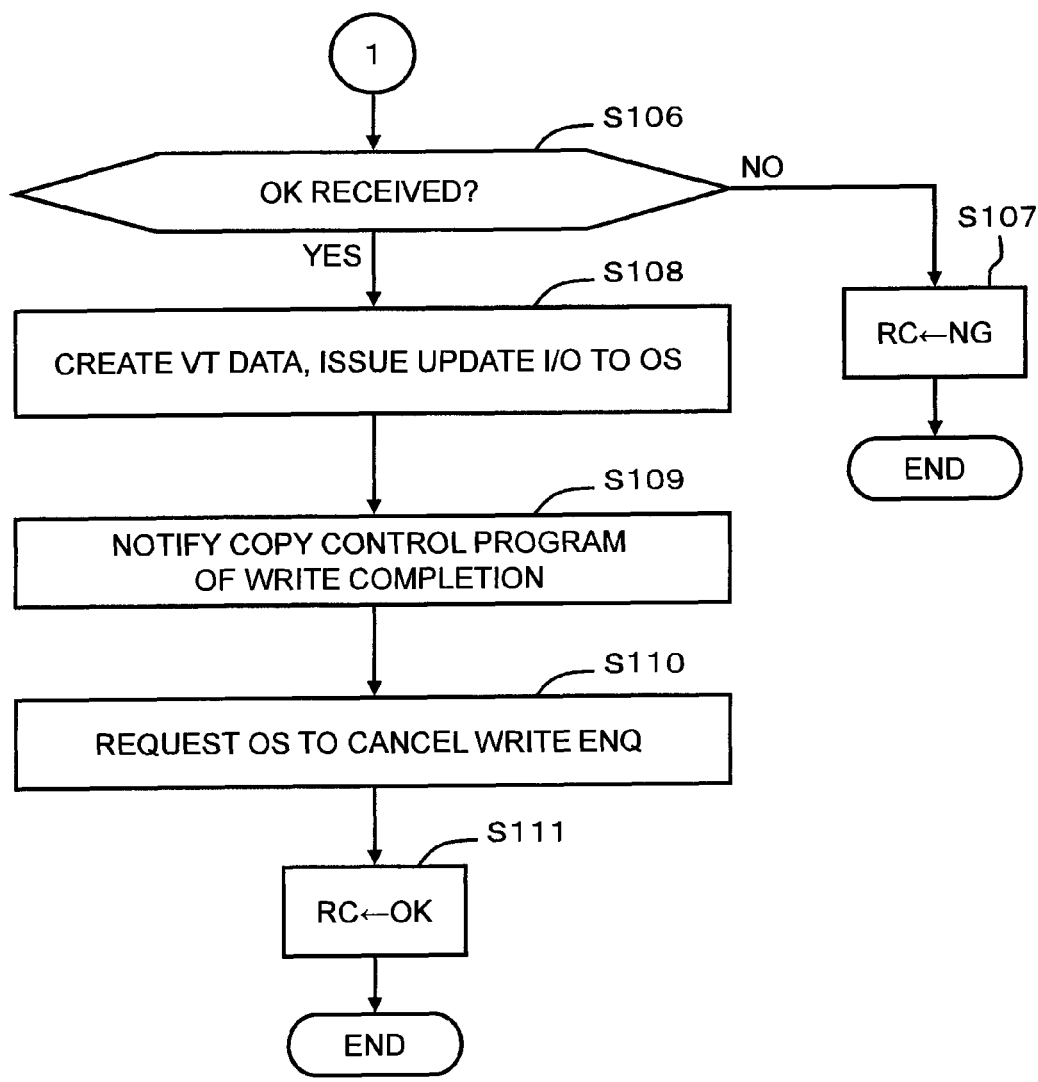
FIG. 16 is a continuation of the flowchart in FIG. 15.

Next, refer to the flowchart in FIG. 16. The VTLS 350P waits for the OK from the copy control program 360P (S106). The OK at S106 means the process result indicating the write start marker 410 has been issued correctly by the copy control program 360P. If for some reason there is a failure to issue the write start marker 410 (S106: NO), the VTLS 350P notifies the VTW program 340P that the procedure has failed (S107).

If the write start marker 410 is issued (S106: YES), the VTLS 350P converts the work data received from the VTW program 340P into tape format data, and issues an update I/O (write I/O) to the OS 310P (S108). In this way, the write data in tape format is transmitted from the OS 310P to the main storage system 20P, and written to the virtual tape. Further, journal data is created based on the write data, and stored in the journal volume 221J in the main storage system 20P.

When updating the virtual tape is completed, the VTLS 350P creates a write termination notification 400 and transmits it to the copy control program 360P (S109). After receiving this notification, the copy control program 360P creates the write completion marker 410 and sends it to the OS 310P, and it is stored in the journal volume 221J in the main storage system 20P. After confirming that the write completion marker 410 has been issued, the VTLS 350P requests the OS 310P to cancel the write enqueue (S110). The VTLS 350P notifies the VTW program 340P that the process has terminated normally (S111).

Figure 17:
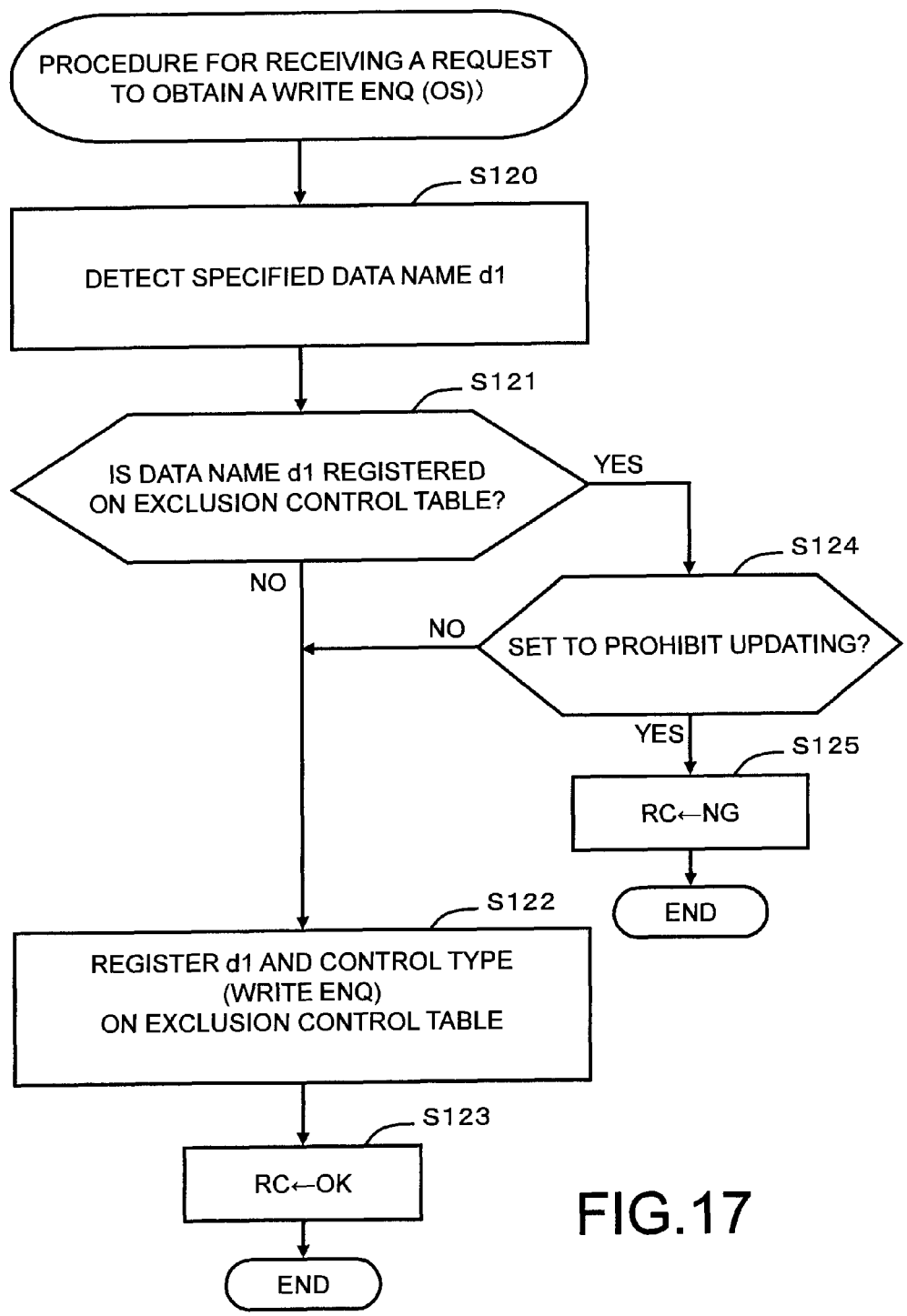
FIG. 17 is a flowchart showing the procedure in the case where the operating system receives a write enqueue.

FIG. 17 shows the procedure for obtaining a write enqueue, executed by the OS 310P, 310S. In the following, OS 310P is stated as the grammatical subject, but the secondary side OS 310S can also carry out this procedure in the same way. The procedures shown in FIGS. 17 through 20 can also be executed by both the primary side OS 310P and the secondary side OS 310S. However, for convenience of explanation, the OS 310P is shown as the grammatical subject.

The OS 310P detects the specified data name d1 (S120). The OS 310P determines whether or not the data name d1 is registered on the exclusion control table T20 (S121).

If the data name d1 is not registered on the exclusion control table T20 (S121: NO), the OS 310P registers the data name d1 and the control type (here, write enqueue) in the exclusion control table T20 (S122). The OS 310P reports to the source of issuing the write enqueue that the process has been completed (S123).

If the data name d1 is registered in the exclusion table T20 (S121: YES), the OS 310P checks whether the registered data name d1 has been set to prohibit updating or not (S124). If updating has been set as prohibited (S124: YES), a write enqueue has been set for the data name d1 by another program, so the OS 310P notifies the source of issuing the write enqueue of the failure to obtain a write enqueue (S125).

If updating has not been set as prohibited for the registered data name d1 in the exclusion control table T20 (S124: NO), the OS 310P sets a write enqueue for the data name d1 in the exclusion control table T20 (S122). In the present embodiment, as stated in connection with FIG. 7, data (virtual tape data) for which a read enqueue has been set cannot be updated. Therefore, in most cases the decision at S124 is NO.

Figure 18:
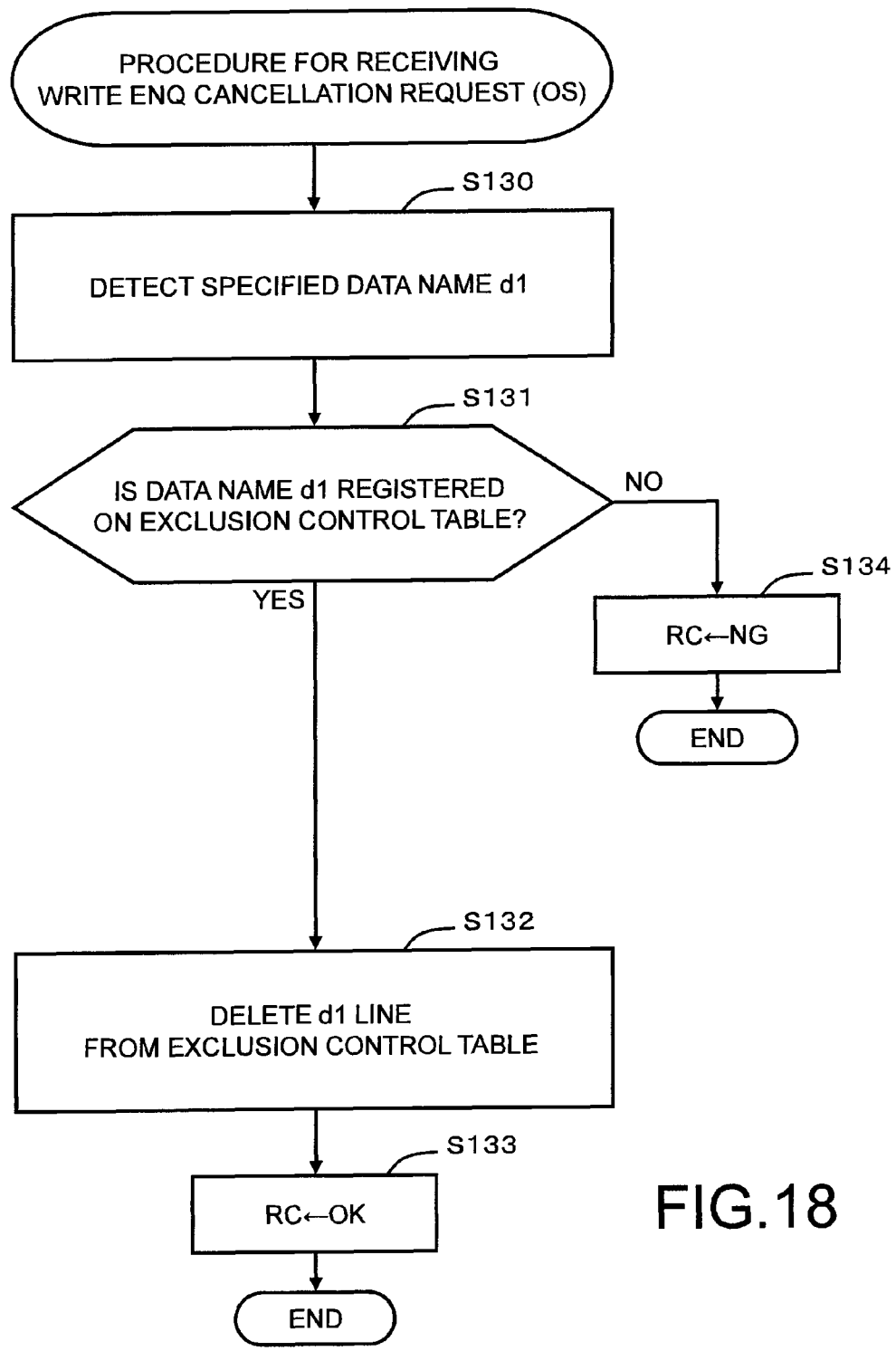
FIG. 18 is a flowchart showing the procedure in the case where the operating system is requested to cancel the write enqueue.

FIG. 18 shows the process of canceling the write enqueue. The OS 310P detects the specified data name d1 (S130), and determines whether or not the data name d1 is registered in the exclusion control table T20 (S131).

If the data name d1 is registered in the exclusion control table T20 (S131: YES), the OS 310P deletes the line containing the data name d1 from the exclusion control table T20 (S132). In this way, the write enqueue for the data name d1 is cancelled, and the access restriction is removed. The OS 310P notifies the source of the write enqueue cancellation request that the write enqueue has been successfully cancelled (S133).

In contrast, if the data name d1 is not registered in the exclusion control table T20 (S131: NO), the OS 310P notifies the source of the write enqueue cancellation request that the process has failed (S134).

Figure 19:
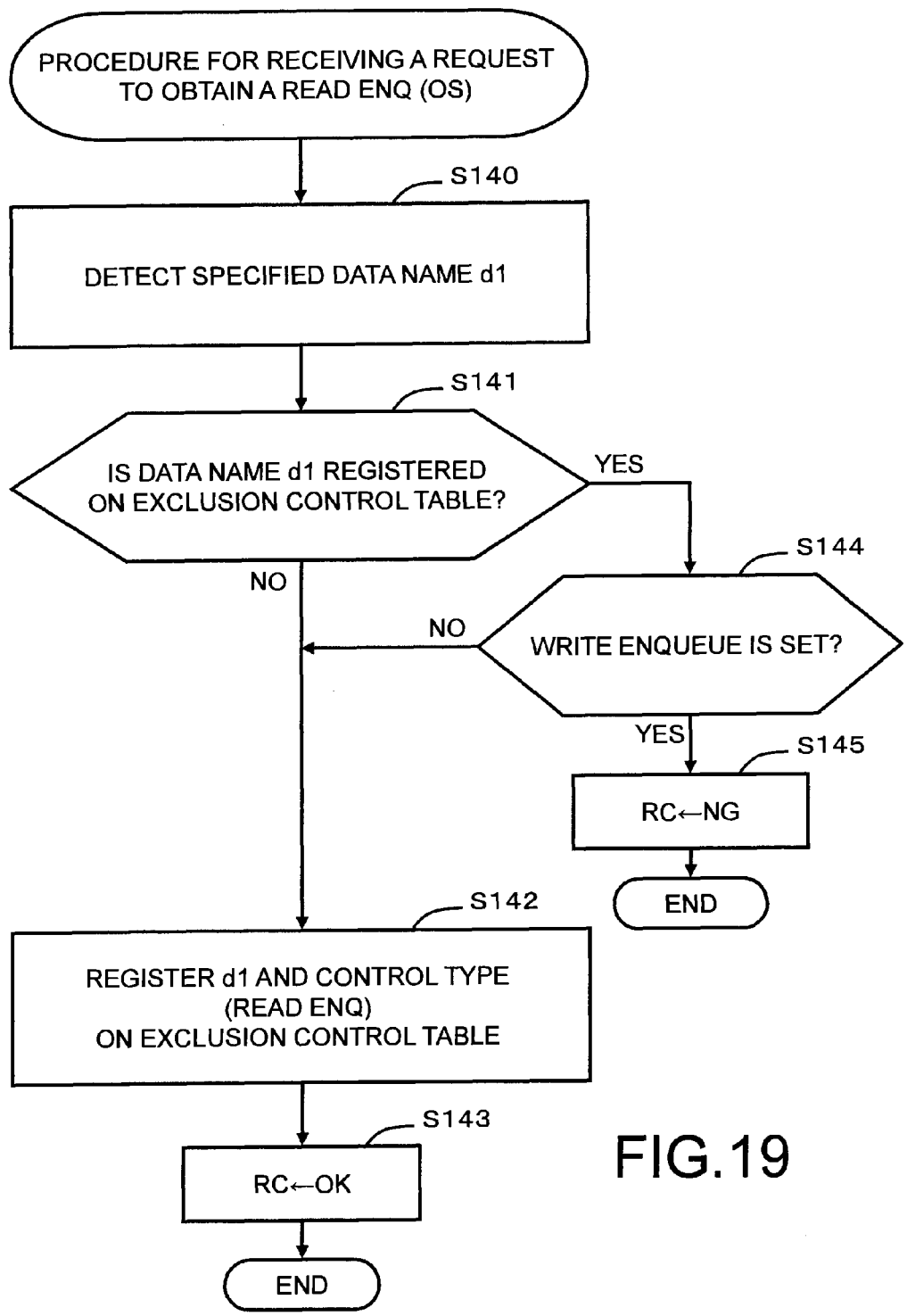
FIG. 19 is a flowchart showing the procedure in the case where the operating system receives a read enqueue.

FIG. 19 shows the process of obtaining a read enqueue. The OS 310P detects the specified data name d1 from the VTR program 330P (S140). The OS 310P determines whether or not the specified data name d1 is registered in the exclusion control table T20 (S141).

If the data name d1 is not registered in the exclusion control table T20 (S141: NO), the OS 310P registers the data name d1 and the control type (here, read enqueue) in the exclusion control table T20 (S142). The OS 310P notifies the source of the read enqueue request that the process has terminated normally (S143).

If the data name d1 is registered in the exclusion control table T20 (S141: YES), the OS 310P checks whether or not updating is prohibited for the data name d1 registered in the exclusion control table T20 (S144).

If the data name d1 is set to write enqueue (S144: YES), the OS 310P notifies the source of the read enqueue that the process has failed (S145).

Figure 20:
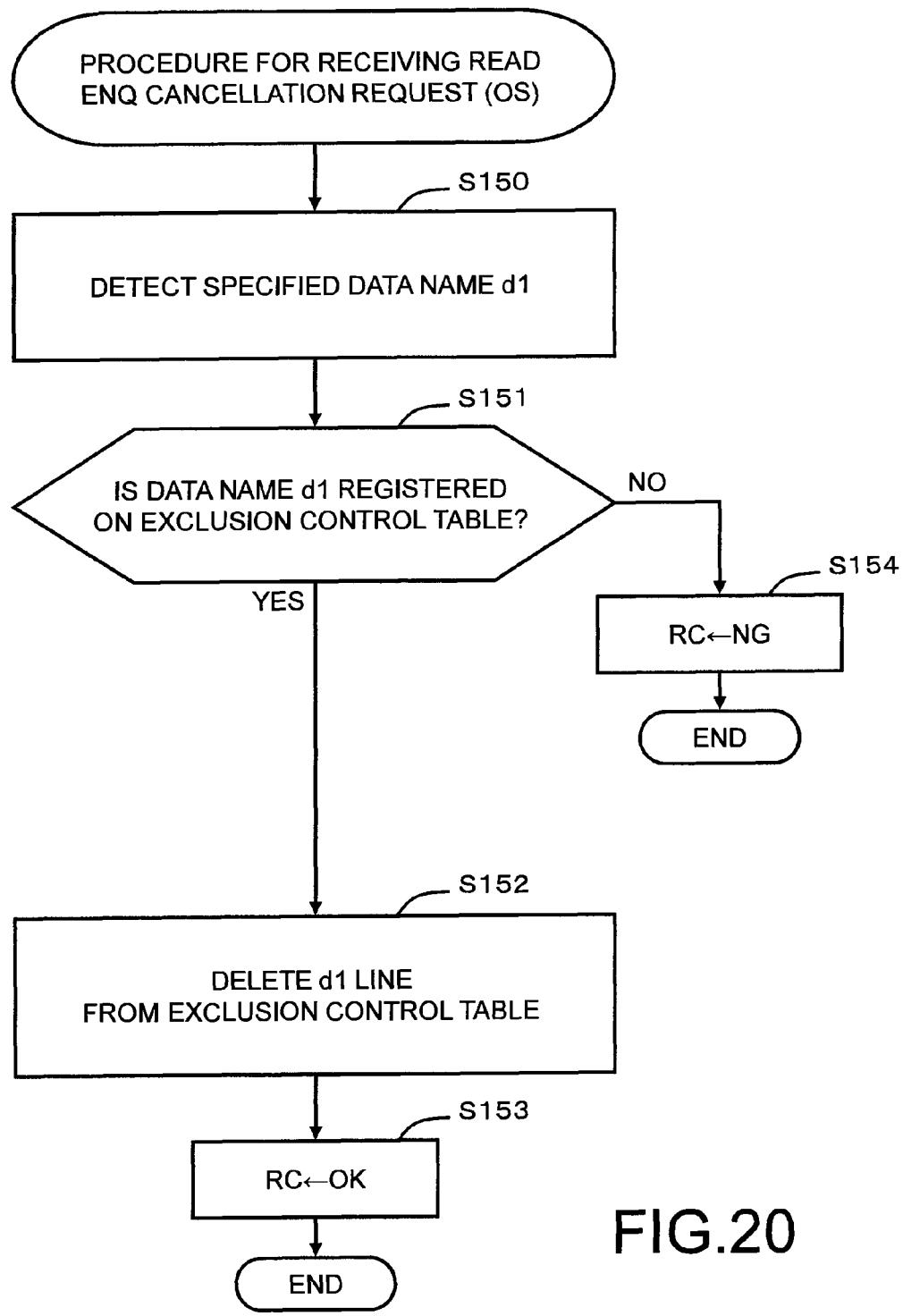
FIG. 20 is a flowchart showing the procedure in the case where the operating system is requested to cancel the read enqueue.

FIG. 20 shows the procedure to cancel a read enqueue. When the OS 310P detects the specified data name d1 (S150), it determines whether or not the data name d1 is registered in the exclusion control table T20 (S151).

If the data name d1 is registered in the exclusion control table T20 (S151: YES), the OS 310P deletes the line containing the data name d1 from the exclusion control table T20 (S152). The OS 310P notifies the source of the read enqueue cancellation request that the read enqueue was successfully cancelled (S153).

If the data name d1 is not registered in the exclusion control table T20 (S151: NO), the OS 310P reports to the source of the read enqueue cancellation request that cancellation of the read enqueue failed (S154).

Figure 21:
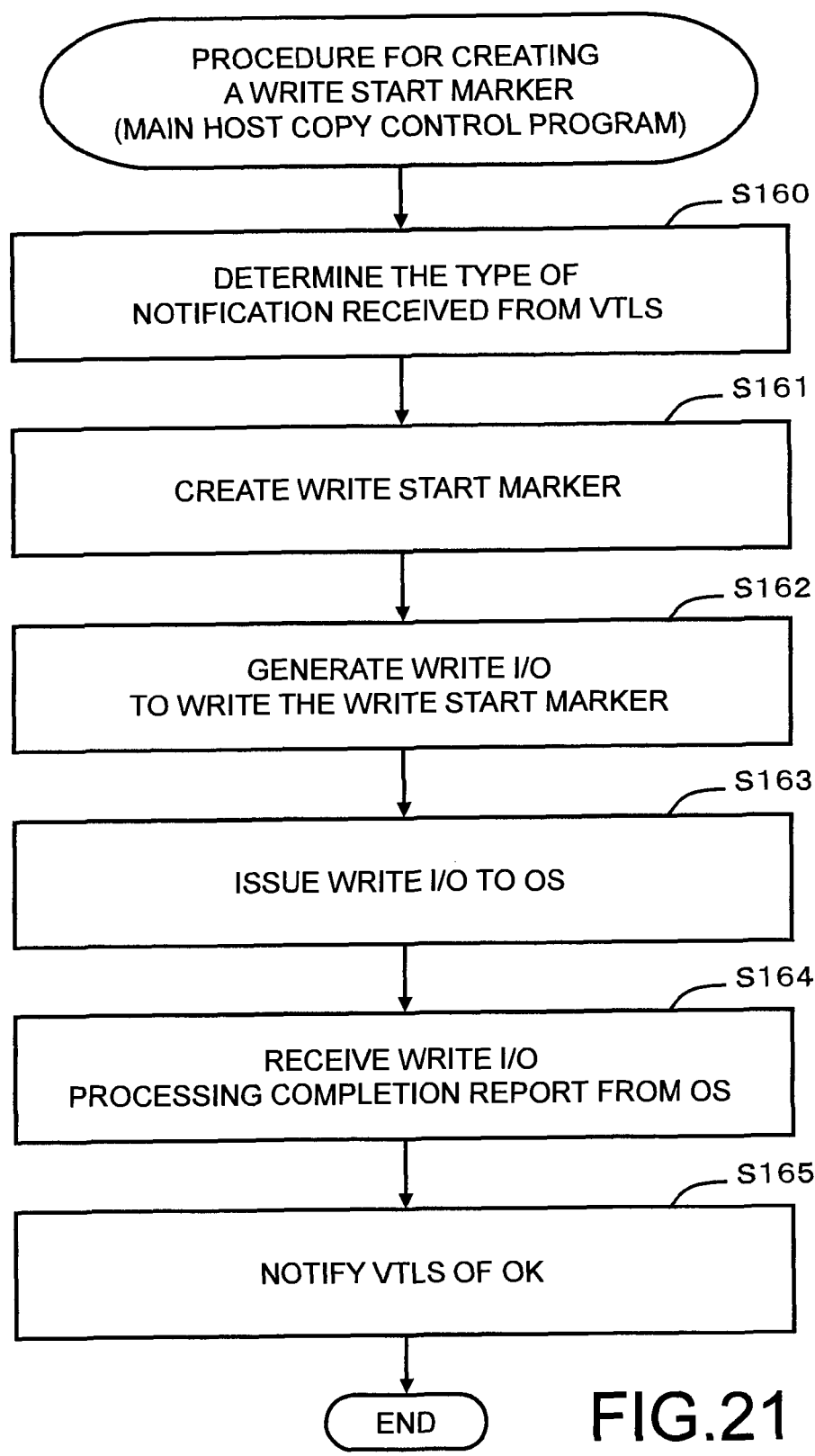
FIG. 21 is a flowchart showing the procedure executed by the main host in the case that a write start notification is received.

FIG. 21 shows the procedure for creating a write start marker, that is executed by the copy control program 360P of the main host 10P. The copy control program 360P determines whether the type of the notification 400 received from the VTLS 350P is a write start notification or a write completion notification (S160).

If it is a write start notification, the copy control program 360P creates a write start marker 410 (S161). The copy control program 360P generates a write I/O 420 to write the write start marker 410 into the journal volume 221J in the main storage system 20P (S162) The copy control program 360P sends the write I/O 420 to the OS 310P (S163). The OS 310P transmits the write I/O 420 to the main storage system 20P.

The copy control program 360P receives notification from the OS 310P that processing the write I/O 420 is completed (S164). The copy control program 360P reports to the VTLS 350P that the write start marker 410 has been normally issued (S165).

Figure 22:
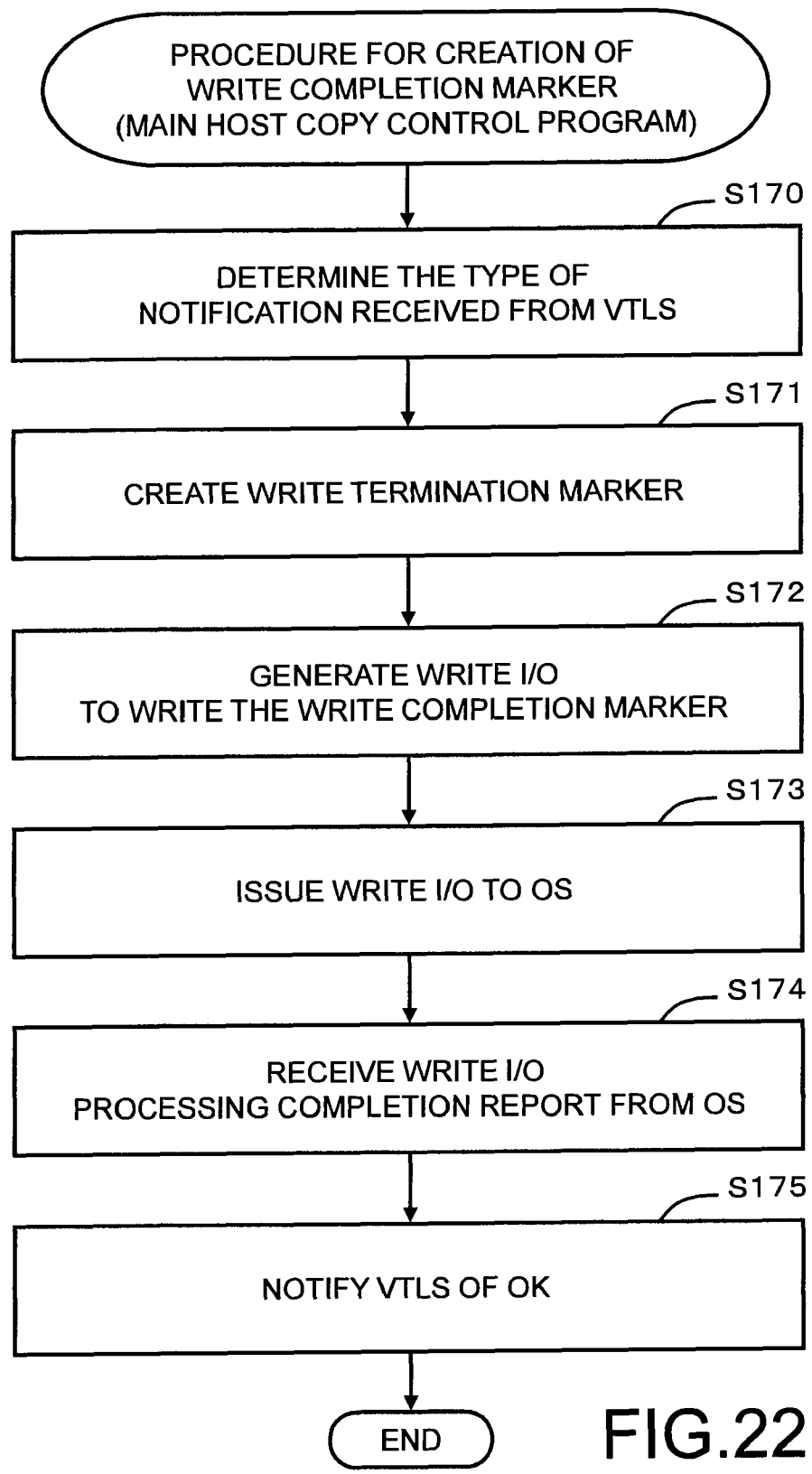
FIG. 22 is a flowchart showing the procedure executed by the main host in the case that a write completion notification is received.

FIG. 22 shows the procedure for creating a write completion marker, that is executed by the copy control program 360P of the main host 10P. The copy control program 360P determines whether the type of notification 400 received from the VTLS 350P is a write start notification or a write completion notification (S170).

If it is a write completion notification, the copy control program 360P creates a write completion marker 410 (S171). The copy control program 360P creates a write I/O 420 to write the write completion marker 410 in the journal volume 221J of the main storage system 20P (S172). The copy control program 360P sends the write I/O 420 to the OS 310P (S173). The OS 310P transmits the write I/O 420 to the main storage system 20P.

The copy control program 360P receives the notification that processing the write I/O 420 is completed from the OS 310P (S174). The copy control program 360P reports to the VTLS 350P that the write completion marker 410 has been issued normally (S175).

Figure 23:
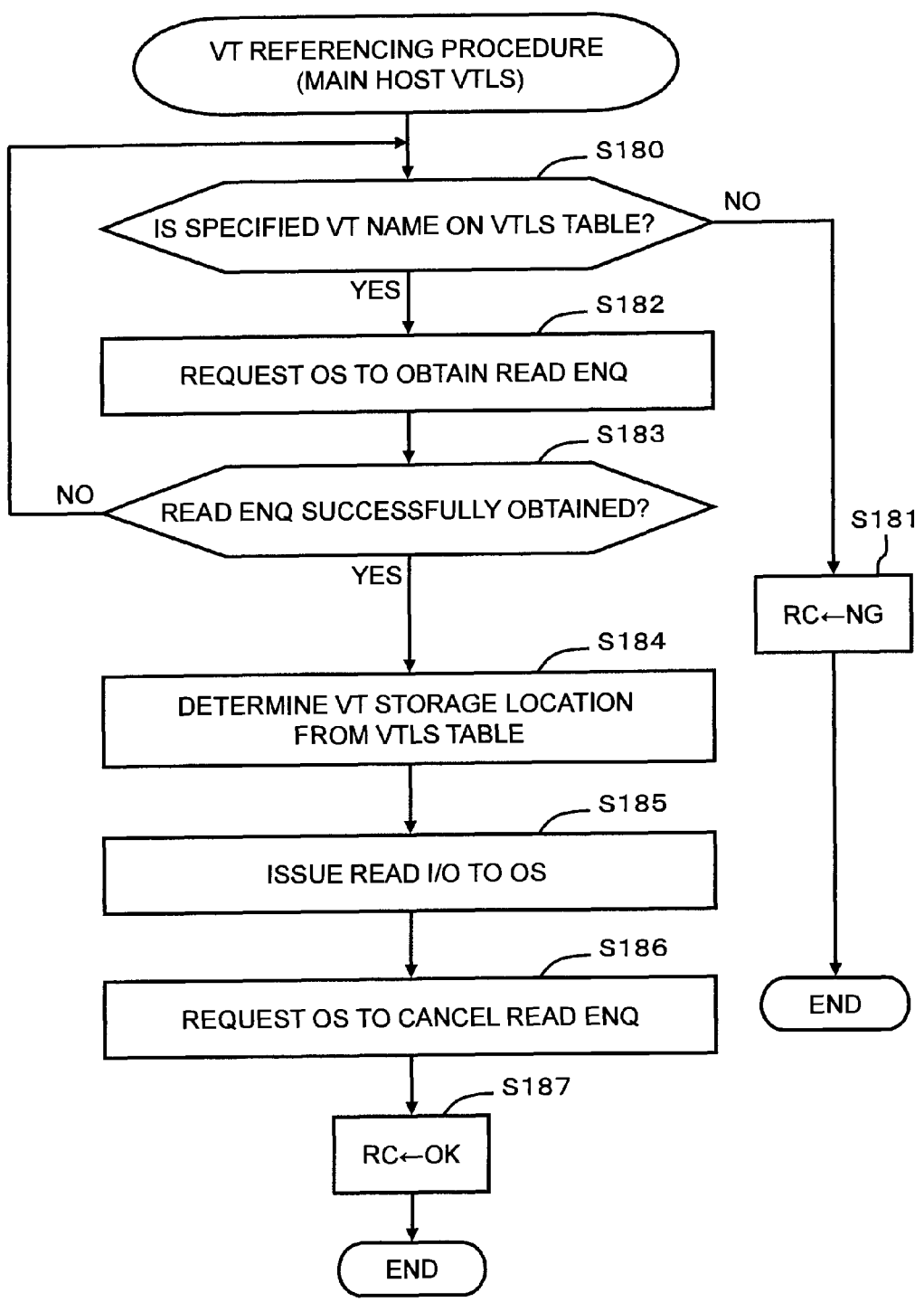
FIG. 23 is a flowchart showing the procedure executed by the main host for referencing the virtual tape recorded in the storage system on the main site.

FIG. 23 shows the procedure for referencing (read process) a virtual tape, that is executed by the VTLS 350P, 350S. In the following explanation, the VTLS 350P is used as the subject. The VTLS 350P determines whether or not the name of the virtual tape specified by the VTR program 330P is registered in the VTLS table T10 (S180). If the specified virtual tape name is not registered in the VTLS table T10 (S180: NO), the VTLS 350P notifies the VTR program 330P that the read process has failed (S181).

If the specified virtual tape name is registered in the VTLS table T10 (S180: YES), the VTLS 350P requests the OS 310P to obtain a read enqueue for the virtual tape name (S182). After receiving the request, the OS 310P tries to obtain a read enqueue.

When the OS 310P succeeds in obtaining the read enqueue (S183: YES), the VTLS 350P obtains the information C12 indicating the virtual tape storage location from the VTLS table T10 (S184). The VTLS 350P generates a read I/O 420 to read the data from the virtual tape, and sends the read I/O 420 to the OS 310P (S185).

The OS 310P transmits the read I/O 420 to the main storage system 20P, and receives the desired data from the main storage system 20P. The OS 310P hands over the received data to the VTLS 350P.

After reading the desired data from the virtual tape, the VTLS 350P instructs the OS 310P to cancel the read enqueue (S186). The VTLS 350P notifies the VTR program 330P that the read process for the virtual tape has been completed (S186).

Figure 24:
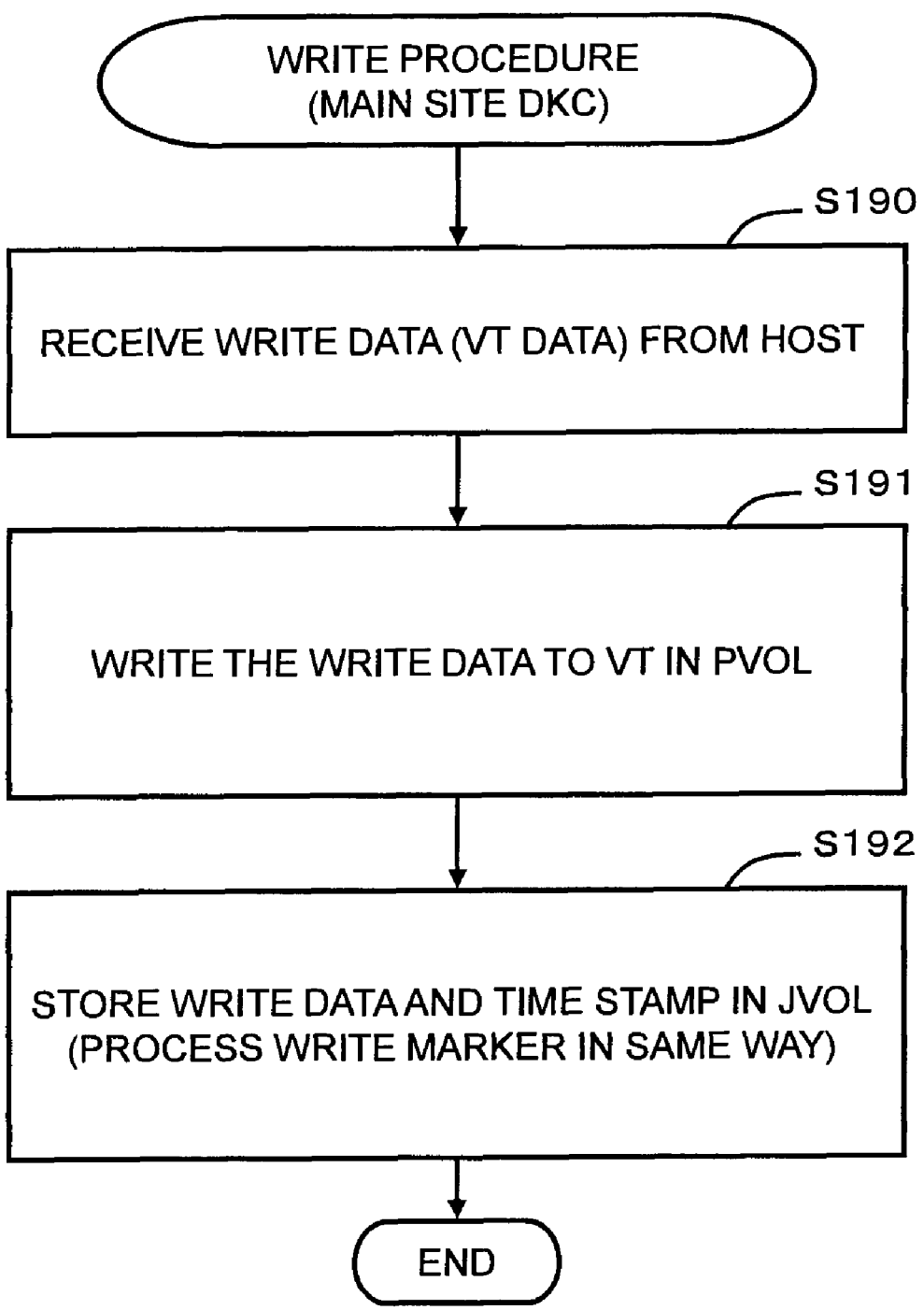
FIG. 24 is a flowchart showing the write procedure executed by the storage system on the main site.

FIG. 24 shows the write procedure executed by the main site 1P. This procedure is applied to write markers in the same way. The main storage system 20P receives the write data from the main host 10P (S190). The main storage system 20P writes the write data to the virtual tape in the primary volume 221P (S191).

Next, the main storage system 20P stores the write data and time stamp in the journal volume 221J of the main storage system 20P as journal data (S192). The write marker (the write start marker and the write completion marker) is also stored in the journal volume 221J as part of the journal data.

Figure 25:
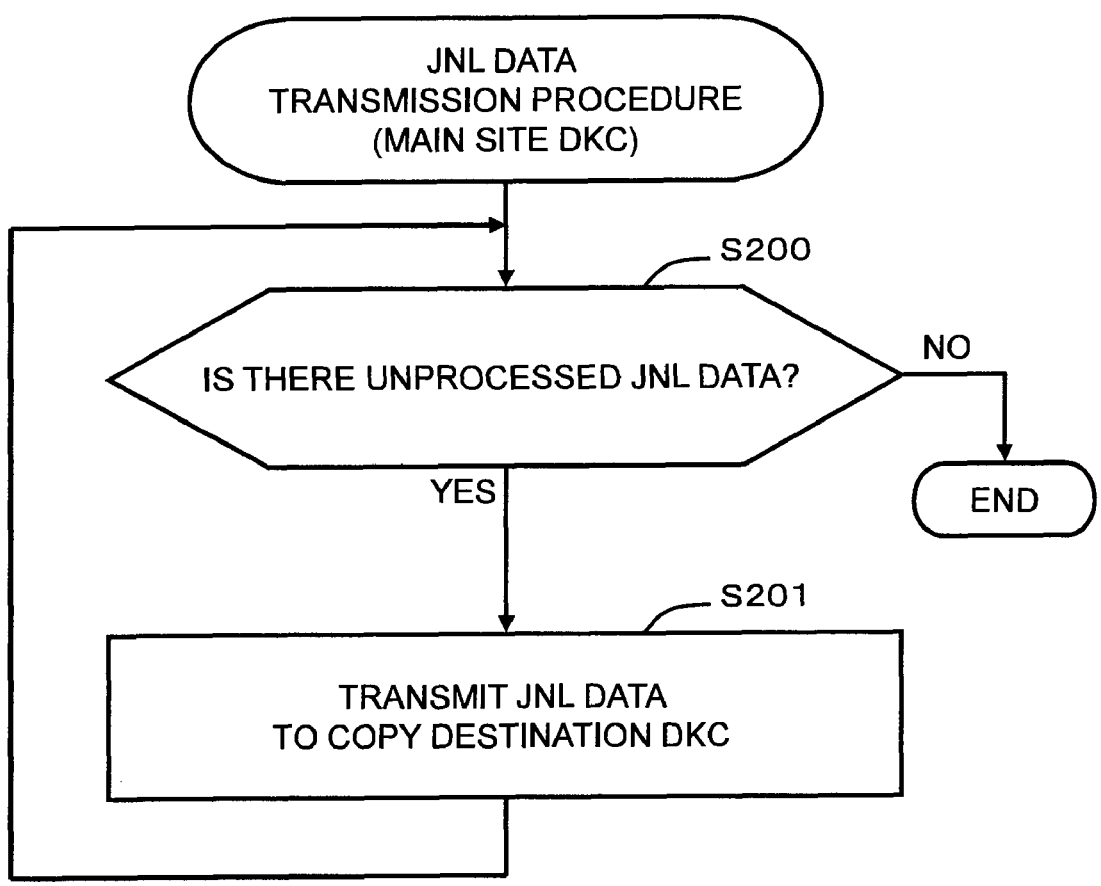
FIG. 25 is a flowchart showing the journal data transmission procedure executed by the storage system on the main site.

FIG. 25 shows the procedure for transmitting the journal data from the main storage system 20P to the DR storage system 20S using asynchronous remote copying. The main storage system 20P determines whether or not there is journal data that has not been transmitted yet (S200). If there is journal data that has not been transmitted (S200: YES), the main storage system 20P transmits the journal data to the DR storage system 20S (S201).

Figure 26:
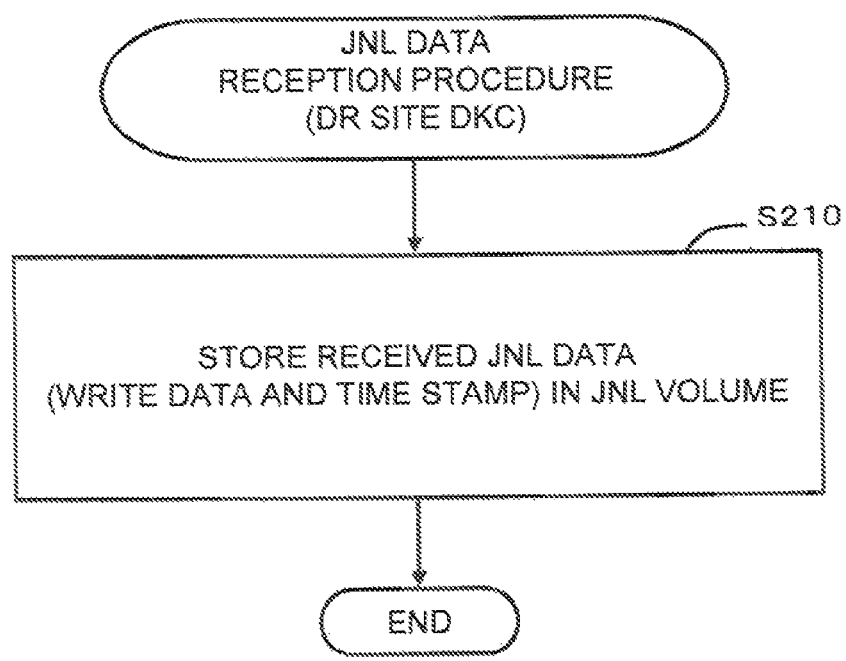
FIG. 26 is a flowchart showing the procedure executed by the storage system on the DR site for receiving journal data.

FIG. 26 shows the procedure for receiving the journal data, executed by the DR storage system 20S. The DR storage system 20S stores the journal data received from the main storage system 20P in the journal volume 221J of the DR storage system 20S (S210).

Figure 27:
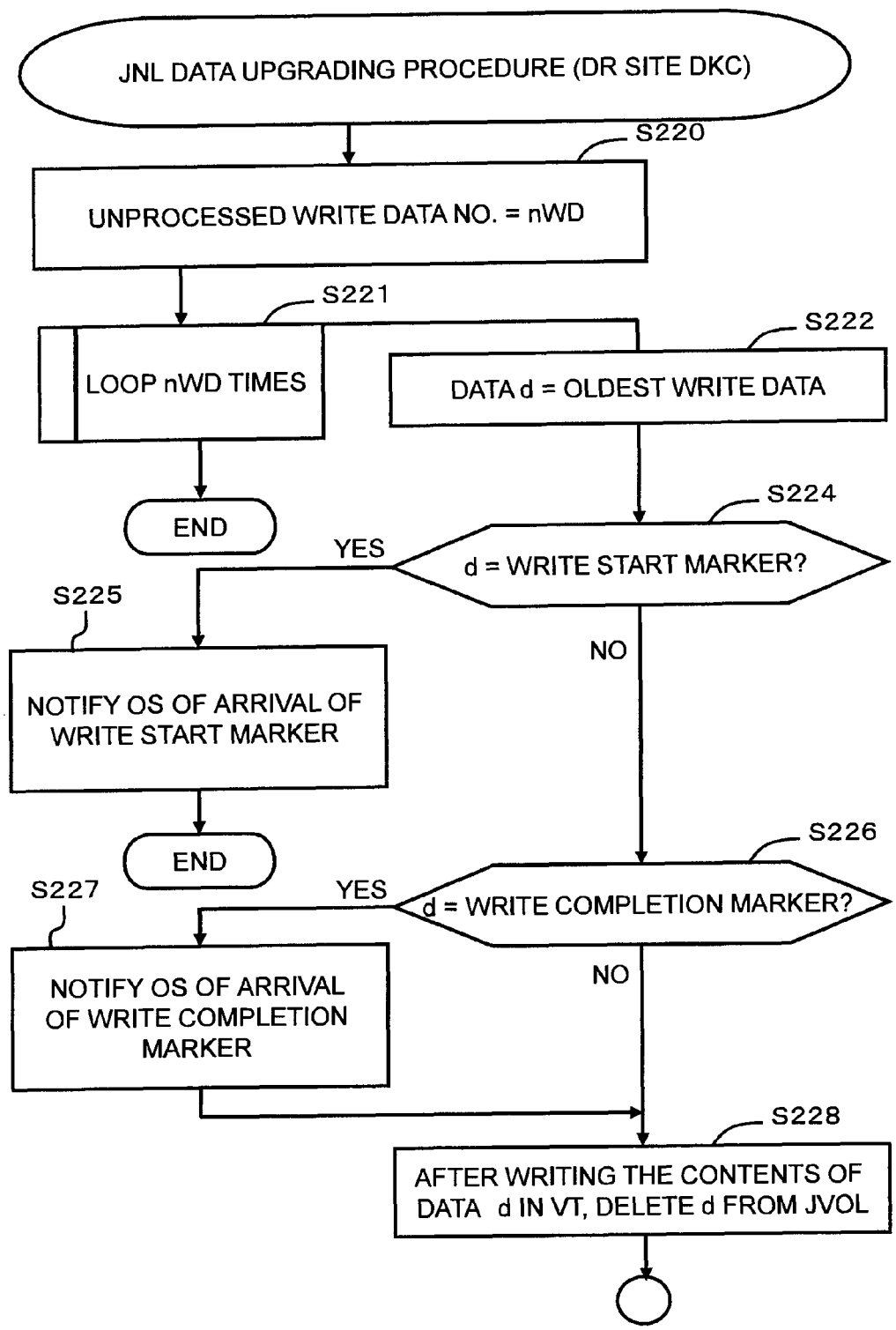
FIG. 27 is a flowchart showing the procedure executed by the storage system on the DR site for reflecting the journal data in a virtual tape.

FIG. 27 shows the procedure for upgrading the journal data, that is executed by the DR storage system 20S. As stated above, in the present embodiment the upgrading process means the process of writing the received journal data into the secondary side virtual tape in the correct sequence. In other words, it is the process to update the contents of a secondary side virtual tape.

The DR storage system 20S sets the number of unprocessed data to nWD (S220), and repeats the following steps nWD times (S221). First, the DR storage system 20S sets the oldest write data among the unprocessed write data accumulated in the journal volume 221J of the DR storage system 20S to be the target data d (S222).

It may get things out of sequence, the DR storage system 20S, subsequently to S226 and S227 described below, writes the target data d into the virtual tape in the secondary side volume 221S, and then deletes the target data d from the journal volume 221J in the DR storage system 20S (S228).

The DR storage system 20S determines whether or not the target data d is a write start marker (S224). If it is a write start marker (S224: YES), the DR storage system 20S reports to the OS 310S that a write start marker has arrived (S225). After reporting to the OS 310S that the write start marker has arrived, the DR storage system 20S terminates this process. In other words, the upgrading process is temporarily stopped.

If the target data d is not a write start marker (S224: NO), the DR storage system 20S determines whether or not the target data d is a write completion marker (S226). If it is a write completion marker (S226: YES), the DR storage system 20S notifies the OS 310S that a write completion marker has been detected (S227). Then, the procedure returns to S222, sets the next write data as the target data d, and repeats the above steps.

Figure 28:
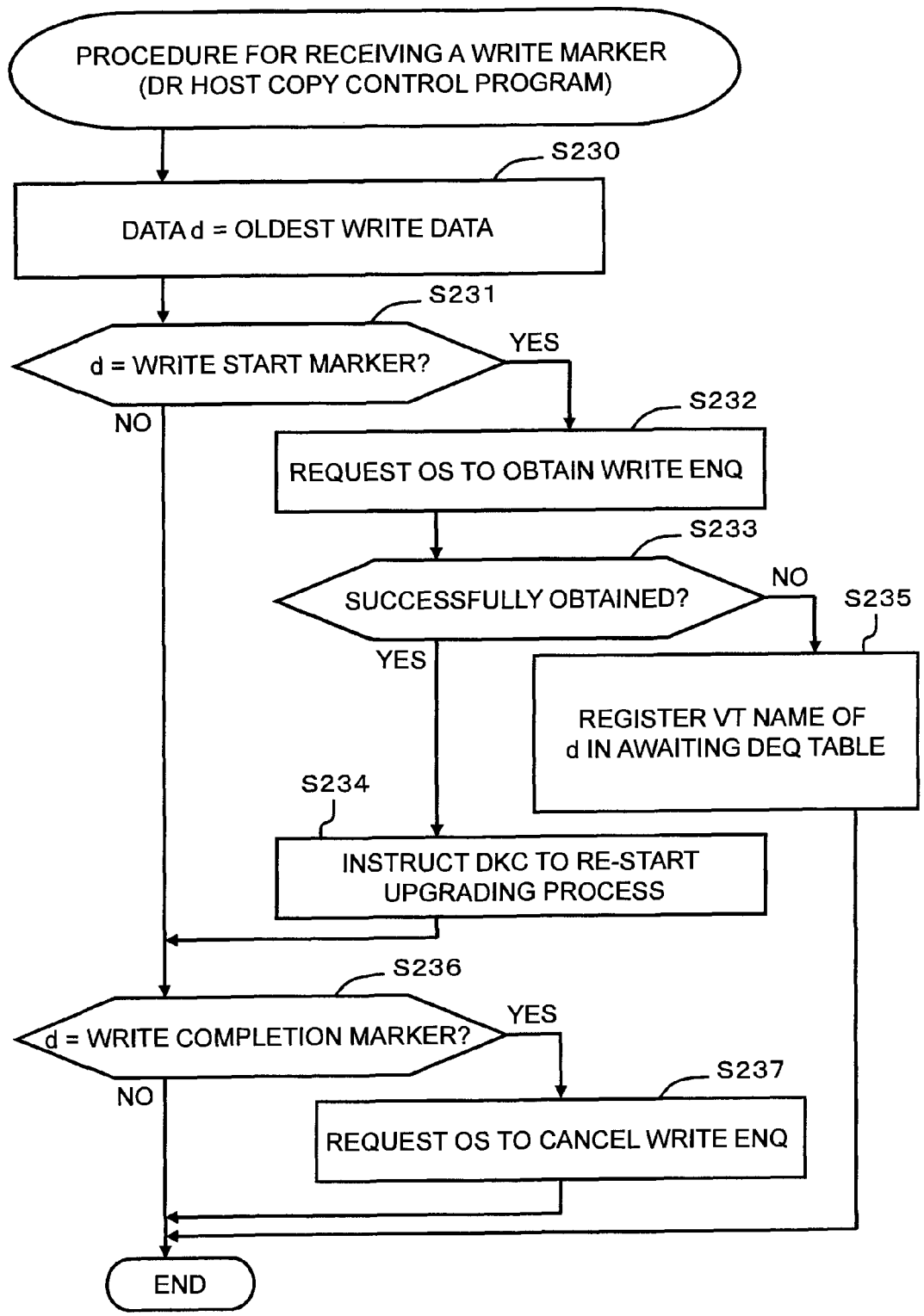
FIG. 28 is a flowchart showing the write marker procedure executed by the host computer (DR host) on the DR site for reflecting the journal data in a virtual tape.

FIG. 28 shows the procedure for receiving a write marker, that is executed by the copy control program 360S in the DR host 10S. The copy control program 360S sets the oldest write data of the unprocessed write data as the target data d (S230).

The copy control program 360S determines whether or not the target data d is a write start marker (S231). If it is a write start marker (S231: YES), the copy control program 360S requests the OS 310S to obtain a write enqueue for the virtual tape specified by the write start marker (S232).

If the OS 310S succeeds in obtaining a write enqueue (S233: YES), the copy control program 360S instructs the DR storage system 20S to re-start the upgrading process (S234).

If the OS 310S fails to obtain the write enqueue (S233: NO), the copy control program 360S registers the name of the target data d (the virtual tape name) in the awaiting dequeue table T30 (S235), and terminates this procedure. The virtual tape is being used by another program, so the procedure waits until the other program is finished using it.

If the target data d is not a write start marker (S231: NO), the copy control program 360S determines whether or not the target data d is a write completion marker (S236). If the target data d is a write completion marker (S236: YES), the copy control program 360S requests the OS 310S to cancel the write enqueue for the virtual tape specified by the write completion marker (S237).

FIG. 29 shows the procedure for receiving the read dequeue, that is executed by the copy control program 360S of the DR host 10S. A read dequeue is a request to cancel a read enqueue.

When the copy control program 360S receives a read dequeue, the copy control program 360S determines whether or not the name of the virtual tape specified in the read dequeue is the same as any of the virtual tape names registered in the awaiting dequeue table T30 (S240).

If the name of the virtual tape included in the read dequeue is the same as a virtual tape name registered on the awaiting dequeue table T30 (S240: YES), the copy control program 360S deletes the virtual tape name from the awaiting dequeue table T30 (S241).

The copy control program 360S sets the virtual tape name included in the read enqueue to be the target data d (S242), and instructs the DR storage system 20S to re-start the upgrading process for the target data d (S243).

In the present embodiment configured in this way, the time that the primary side virtual tape is updated is identified using the write start marker and the write completion marker, and the DR storage system 20S is notified using journal data. Also, the DR storage system 20S notifies the OS 310S of the receipt of the write start markers and the write completion markers, and access control is executed for the secondary side virtual tape.

In this way, the times when the contents of the virtual tape on the secondary side on the DR site 1S are maintained consistent with the contents of the virtual tape on the primary site can be made clear, so it is possible to reference, analyze, and so on, the contents of the secondary side virtual tape. Therefore, it is possible to more effectively use the secondary side virtual tapes, which formerly only served the role of back up data, and improve the availability of the computer system.

In the present embodiment, a configuration in which normal journal data is transmitted by asynchronous remote copying is used, and the DR storage system 20S is notified of the time of updating the primary side virtual tape. Therefore, by simply providing the copy control programs 360P, 360S in the hosts 10P, 10S, and providing a function for detecting write markers in the DR storage system 20S, the availability can be improved.

In the present embodiment, on the DR site 1S side, when a certain program is using the secondary side virtual tape, the upgrading process waits until this use is finished before starting. Therefore it is possible to prevent changing the contents of the virtual tape while a program is using (referencing) the secondary side virtual tape.

Embodiment 2

The following is an explanation of a second embodiment based on FIG. 30. The present embodiment is a modification of the first embodiment, so the points of difference from the first embodiment are explained.

FIG. 30 shows the procedure for monitoring unprocessed write data, that is executed by the copy control program 360S on the DR host 10S.

The copy control program 360S obtains the quantity of unprocessed write data nWD that has not been used in the upgrading process, via the OS 310S (S250). The copy control program 360S determines whether the quantity of unprocessed write data nWD exceeds a predetermined specific threshold value Th1 (S251).

If the quantity of unprocessed write data nWD exceeds the threshold value Th1 (S251: YES), the copy control program 360S outputs a message to the management device 30S (S252). This message can include a warning to alert the user that the upgrading process has been delayed. After receiving the message, the user can suspend referencing the secondary side virtual tapes, and re-start the upgrading process.

The present embodiment configured in this way has the same effect as the first embodiment. In addition, in the present embodiment, when the use of the secondary side virtual tapes goes on for a long time and the upgrading process is delayed, it is possible to output a specific message. Therefore, in the present embodiment, it is possible to maintain a balance between the use of the copy data (the secondary side virtual tape) on the DR site S1 and the process of updating the copy data, so the availability is further improved.

The present invention is not limited to the above embodiments. A person skilled in the art to which the present invention pertains can make various additions or modifications, such as by combining the above embodiments as appropriate, and so on, within the scope of the present invention.

What is claimed is:

1. A remote copying method executed by a computer system that includes a first computer; a first storage system coupled to the first computer; a second storage system coupled to the first storage system; and a second computer coupled to the second storage system, the remote copying method comprising the steps of:
    the first storage system creating a first logical volume that is accessed by the first computer;
    the second storage system creating a second logical volume in which a copy of the data stored in the first logical volume is stored;
    the first computer executing a first operating system and a first program, and transmitting a plurality of write data generated by the first program to the first storage system;
    the second computer executing a second operating system and a second program;
    the first operating system receiving an enqueue request which is issued by the first program, specifying a first data object, and indicating the start of updating to ensure consistency of the first data object with the first program, and transmitting a start marker request that includes information on the first data object to the first storage system;
    the first operating system receiving a dequeue request which is issued by the first program, specifying the first data object, and indicating completion of updating relating to the first data object, and transmitting an end marker request that includes information on the first data object to the first storage system;
    the first storage system receiving the plurality of write data, the start marker request and the end marker request, and updating the data stored in the first logical volume using the plurality of write data;
    the first storage system generating a plurality of transmission data including the plurality of write data, start marker information corresponding to the start marker request, end marker information corresponding to the end marker request, and a plurality of sequence information on the timing of receipt of the plurality of write data, the start marker information and the end marker information;
    the first storage system transmitting the plurality of transmission data to the second storage system asynchronously with the receipt of the plurality of write data;
    the second storage system receiving the plurality of transmission data;
    the second storage system identifying, based on the sequence information, a series of write data included in the plurality of transmission data, relating to a second data object that is a copy of the first data object, and including the plurality of write data received by the first storage system after receipt of the start marker request and before receipt of the end marker request;
    the second storage system transmitting an update start notification that includes information on the second object to the second computer, in accordance with a judgment that the data stored in the second logical volume is to be updated using a part or all of the series of write data;
    the second program issuing an enqueue request specifying the second data object to the second operating system, and if the enqueue request is successful, transmitting to the second storage system a response to the update start notification via the second operating system;
    the second storage system starting to update the data stored in the second logical volume using the series of write data, and, when updating of the data stored in the second logical volume is completed, transmitting an update completion notification to the second computer; and
    the second program issuing a dequeue request specifying the second data object to the second operating system when the update completion notification is received.

2. A remote copying method according to claim 1, wherein the second computer executes a third program, and the second operating system manages the second data object so that reading or writing the data of the second data object by the third program is prevented from receipt of the enqueue request specifying the second data object until receipt of the dequeue request specifying the second data object.

3. A remote copying method according to claim 2, wherein the first computer executes a fourth program, and the first operating system manages the first data object so that reading or writing the data of the first data object by the fourth program is prevented from receipt of the enqueue request specifying the first data object until receipt of the dequeue request specifying the first data object.

4. A remote copying method according to claim 2, wherein the third program issues the enqueue request specifying the second data object to the second operating system, and if the enqueue request is successful, reads data from the second data object, then issues the dequeue request specifying the second data object to the second operating system.

5. A remote copying method according to claim 4, wherein the computer system includes a back up storage system, and the third program transmits the data on the second data object to the back up storage system as data in a state that is consistent with the first program.

6. A remote copying method according to claim 5, wherein the first data object is a data unit that can be recognized by the first storage system.

7. A remote copying method according to claim 6, wherein the first data object is data that cannot be recognized by the first storage system, but can be recognized by the first program.

8. A remote copying method according to claim 1,
    wherein the second program obtains unused data quantity information on the quantity of write data that has not been used for updating the data stored in the second logical volume, from among the plurality of write data stored in the second storage system, and
    wherein the second program displays, based on the unused data quantity information, information indicating that the quantity of write data stored in the second storage system exceeds a predetermined threshold for the purpose of waiting for the enqueue request to succeed.

9. A computer system comprising:
    a first computer;
    a first storage system coupled to the first computer;

a second storage system coupled to the first storage system; and a second computer coupled to the second storage system, the computer system performing remote copying from the first storage system to the second storage system, wherein the first storage system creates a first logical volume that is accessed by the first computer, wherein the second storage system creates a second logical volume in which a copy of the data stored in the first logical volume is stored, wherein the first computer executes a first operating system and a first program, and transmits a plurality of write data generated by the first program to the first storage system, wherein the second computer executes a second operating system and a second program, wherein the first operating system receives an enqueue request which is issued by the first program, specifics a first data object, and indicates the start of updating to ensure consistency of the first data object with the first program, and transmits a start marker request that includes information on the first data object to the first storage system, wherein the first operating system receives a dequeue request which is issued by the first program, specifies the first data object, and indicates completion of updating relating to the first data object, and transmits an end marker request that includes information on the first data object to the first storage system, wherein the first storage system receives the plurality of write data, the start marker request and the end marker request, and updates the data stored in the first logical volume using the plurality of write data, wherein the first storage system generates a plurality of transmission data including the plurality of write data, start marker information corresponding to the start marker request, end marker information corresponding to the end marker request, and a plurality of sequence information on the timing of receipt of the plurality of write data, the start marker information and the end marker information, wherein the first storage system transmits the plurality of transmission data to the second storage system asynchronously with the receipt of the plurality of write data, wherein the second storage system receives the plurality of transmission data, wherein the second storage system identifies, based on the sequence information, a series of write data included in the plurality of transmission data, relating to a second data object that is a copy of the first data object, and including the plurality of write data received by the first storage system after receipt of the start marker request and before receipt of the end marker request, wherein the second storage system transmits an update start notification that includes information on the second object to the second computer, in accordance with a judgment that the data stored in the second logical volume is to be updated using a part or all of the series of write data, wherein the second program issues an enqueue request that specifies the second data object to the second operating system, and if the enqueue request is successful, transmits to the second storage system a response to the update start notification via the second operating system, wherein the second storage system starts to update the data stored in the second logical volume using the series of write data, and, when updating of the data stored in the second logical volume is completed, transmits an update completion notification to the second computer, and wherein the second program issues a dequeue request specifying the second data object to the second operating system when the update completion notification is received.

10. A computer system according to claim 9, wherein the second computer executes a third program, and the second operating system manages the second data object so that reading or writing the data of the second data object by the third program is prevented from receipt of the enqueue request specifying the second data object until receipt of the dequeue request specifying the second data object.

11. A computer system according to claim 10, wherein the first computer executes a fourth program, and the first operating system manages the first data object so that reading or writing the data of the first data object by the fourth program is prevented from receipt of the enqueue request specifying the first data object until receipt of the dequeue request specifying the first data object.

12. A computer system according to claim 10, wherein the third program issues the enqueue request specifying the second data object to the second operating system, and if the enqueue request is successful, reads data from the second data object, then issues the dequeue request specifying the second data object to the second operating system.

13. A computer system according to claim 12, wherein the computer system includes a back up storage system, and the third program transmits the data on the second data object to the back up storage system as data in a state that is consistent with the first program.

14. A computer system according to claim 13, wherein the first data object is a data unit that can be recognized by the first storage system.

15. A computer system according to claim 14, wherein the first data object is data that cannot be recognized by the first storage system, but can be recognized by the first program.

16. A computer system according to claim 9,
wherein the second program obtains unused data quantity information on the quantity of write data that has not been used for updating the data stored in the second logical volume, from among the plurality of write data stored in the second storage system, and
wherein the second program displays, based on the unused data quantity information, information indicating that the quantity of write data stored in the second storage system exceeds a predetermined threshold for the purpose of waiting for the enqueue request to succeed.

17. A computer system according to claim 9, wherein the first program is configured as a table library management program for converting specified data into data in tape format and managing the data, the first data object is data in tape format that is managed by the first program, and the first storage system transmits the plurality of transmission data to the second storage system in block data format.

18. A computer system according to claim 9, wherein the second program is incorporated into the second operating system.

19. A computer system according to claim 9, wherein a plurality of first data objects can be provided within the first logical volume.

20. A computer system according to claim 9, wherein the first storage system comprises a first transmission data logical volume for storing the plurality of transmission data, and the second storage system comprises a second transmission data logical volume for storing the plurality of transmission data received from the first storage system.

* * * * *